(12) United States Patent
Hirahara

(10) Patent No.: US 8,601,168 B2
(45) Date of Patent: Dec. 3, 2013

(54) INFORMATION PROCESSING APPARATUS AND METHOD THEREOF

(75) Inventor: Akiko Hirahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 13/101,671

(22) Filed: May 5, 2011

(65) Prior Publication Data

US 2011/0279857 A1  Nov. 17, 2011

(30) Foreign Application Priority Data

May 13, 2010 (JP) ................................. 2010-111538

(51) Int. Cl.
*G06F 3/00* (2006.01)
(52) U.S. Cl.
USPC .................................. 710/6; 710/58; 358/1.15
(58) Field of Classification Search
None
See application file for complete search history.

(56) References Cited

U.S. PATENT DOCUMENTS

| 2003/0035142 | A1* | 2/2003 | Kizaki | 358/1.16 |
| 2005/0122539 | A1* | 6/2005 | Sugimoto | 358/1.15 |
| 2010/0077024 | A1* | 3/2010 | Yun | 709/203 |
| 2010/0091158 | A1* | 4/2010 | Yamashita | 348/300 |
| 2011/0269514 | A1* | 11/2011 | Ge | 455/574 |

FOREIGN PATENT DOCUMENTS

JP  2007-328742 A  12/2007

* cited by examiner

*Primary Examiner* — Elias Mamo
(74) *Attorney, Agent, or Firm* — Canon U.S.A., Inc., IP Division

(57) ABSTRACT

An information processing apparatus registers, in a reservation list, transmission reservation data including a transmission start time and a transmission completion time of charging counter information that is a type of operation information to be regularly transmitted according to a predetermined cycle. The information processing apparatus then registers, in the reservation list, with respect to other types of the operation information to be regularly transmitted (e.g., firmware information), transmission reservation data including a transmission start time and a transmission completion time that are determined so that the operation information is regularly transmitted in a different period than regular transmission of operation information corresponding to transmission reservation data already registered in the reservation list. The information processing apparatus controls transmission of the operation information by a regular transmission thread to a management apparatus according to the reservation list.

11 Claims, 15 Drawing Sheets

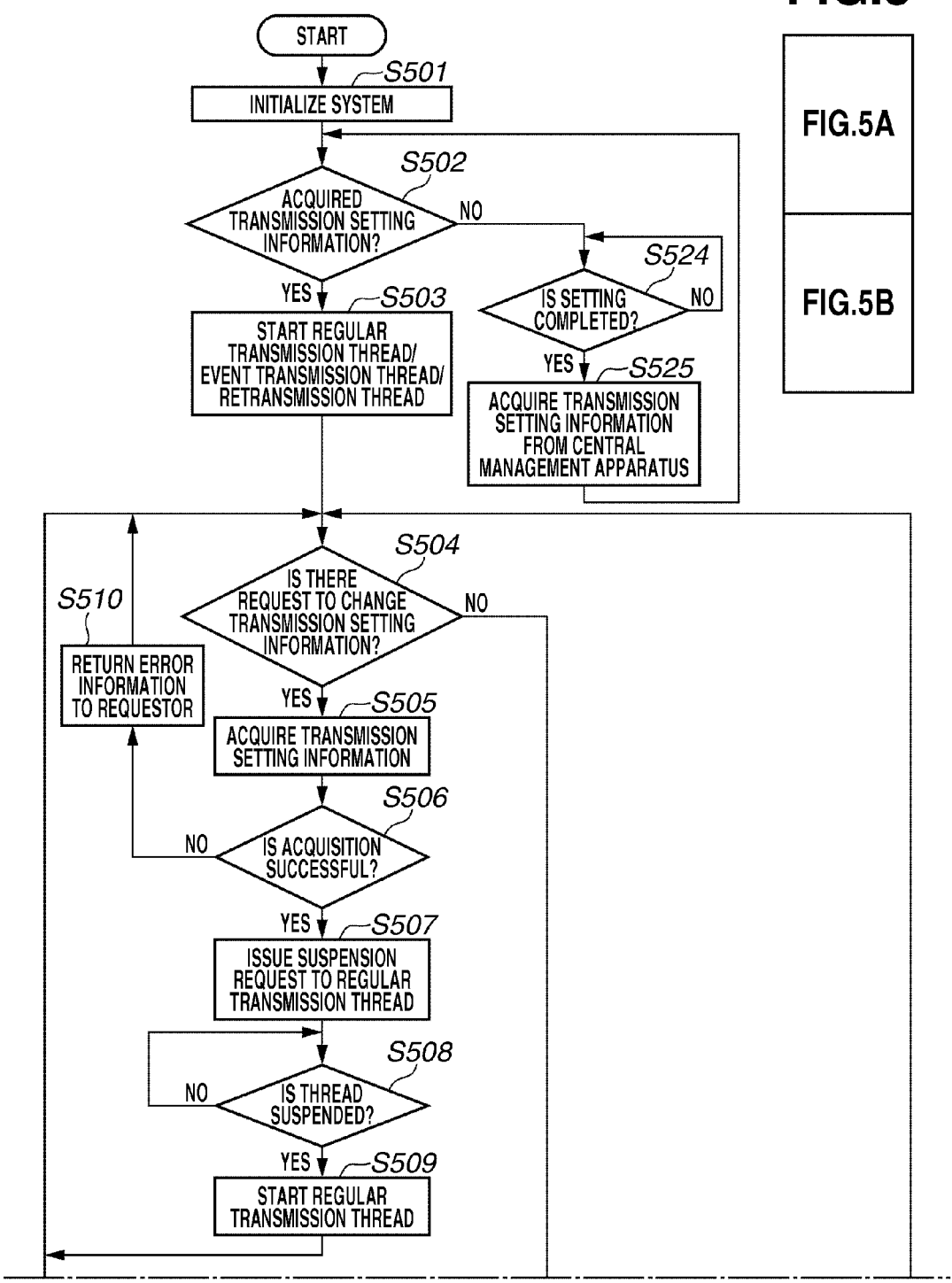

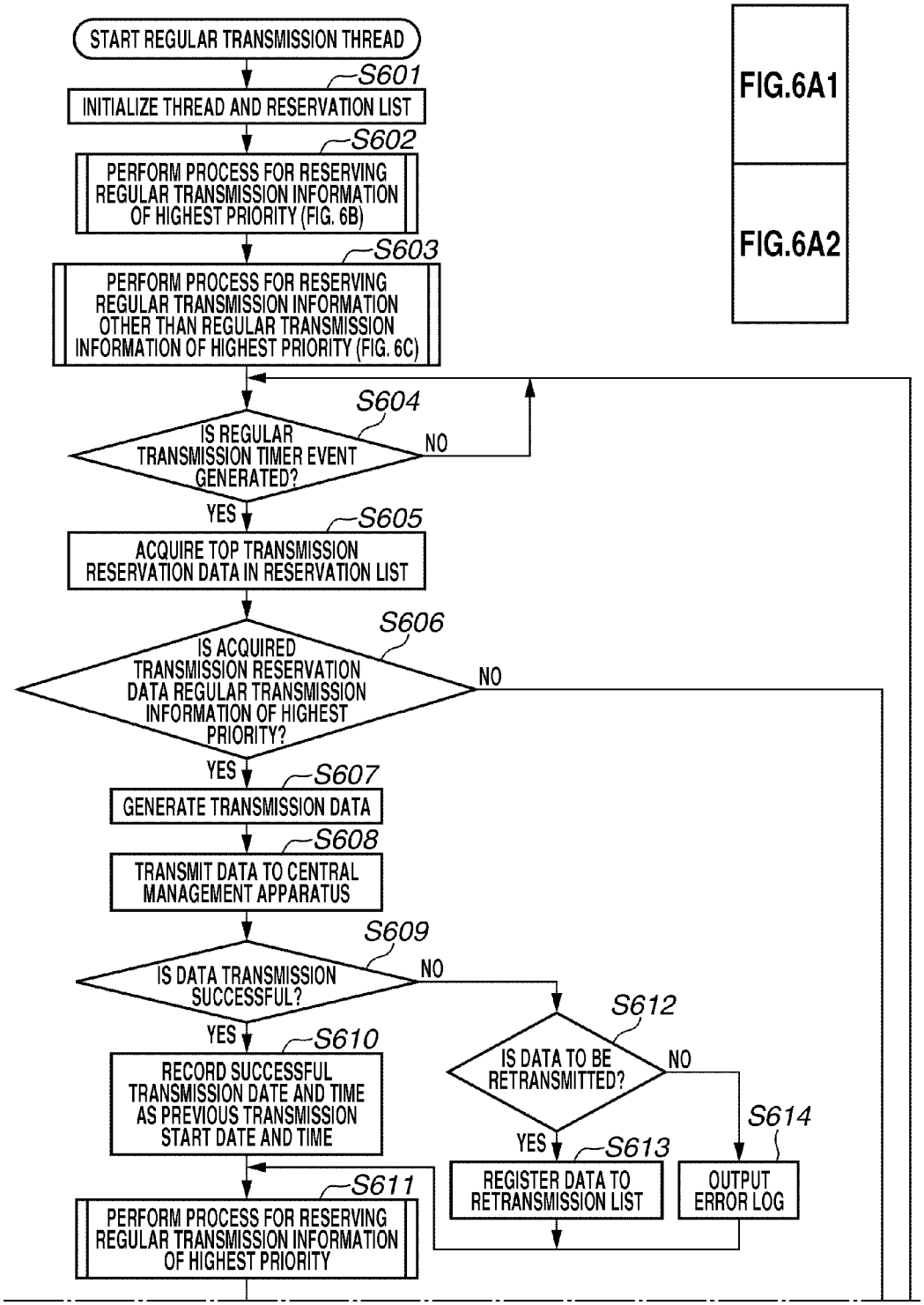

FIG.6A2
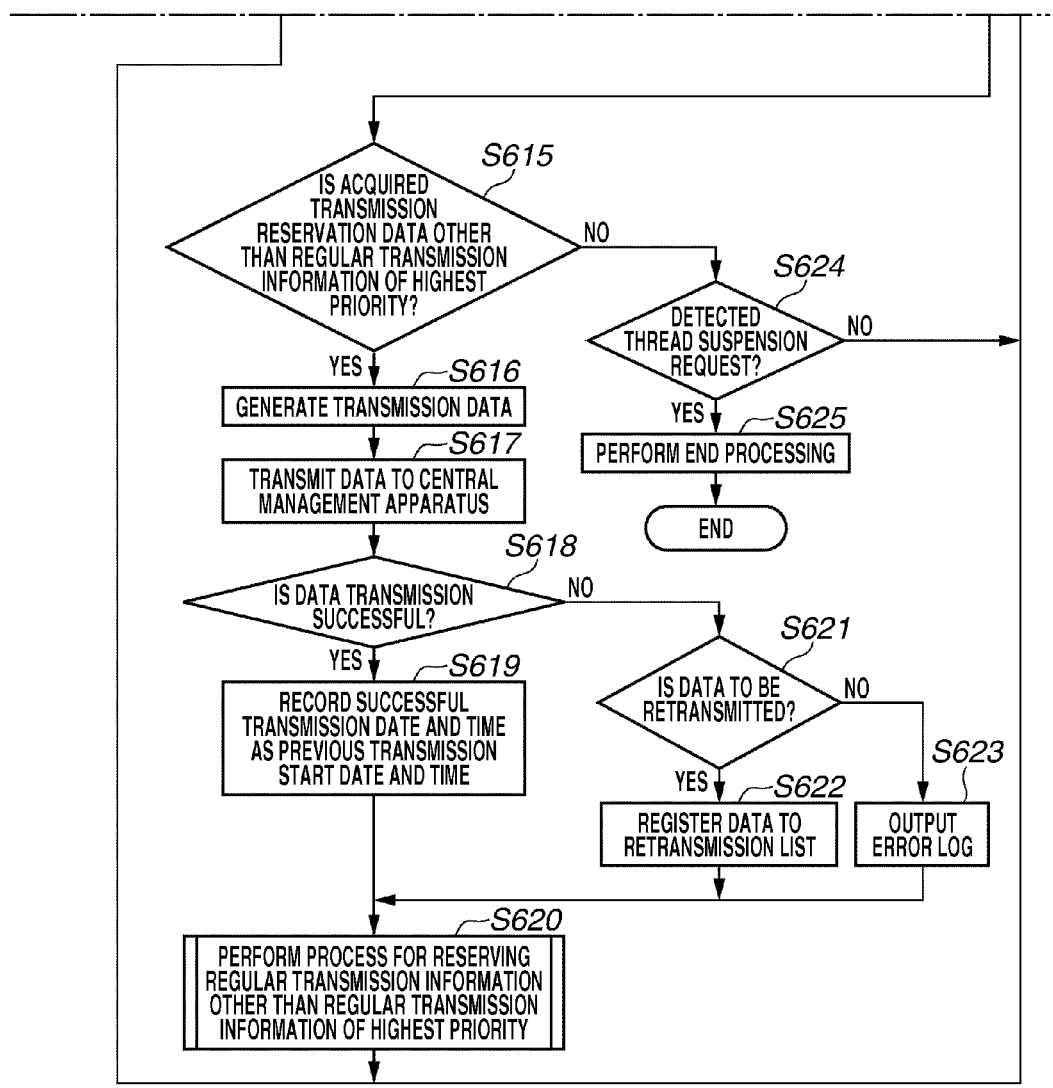

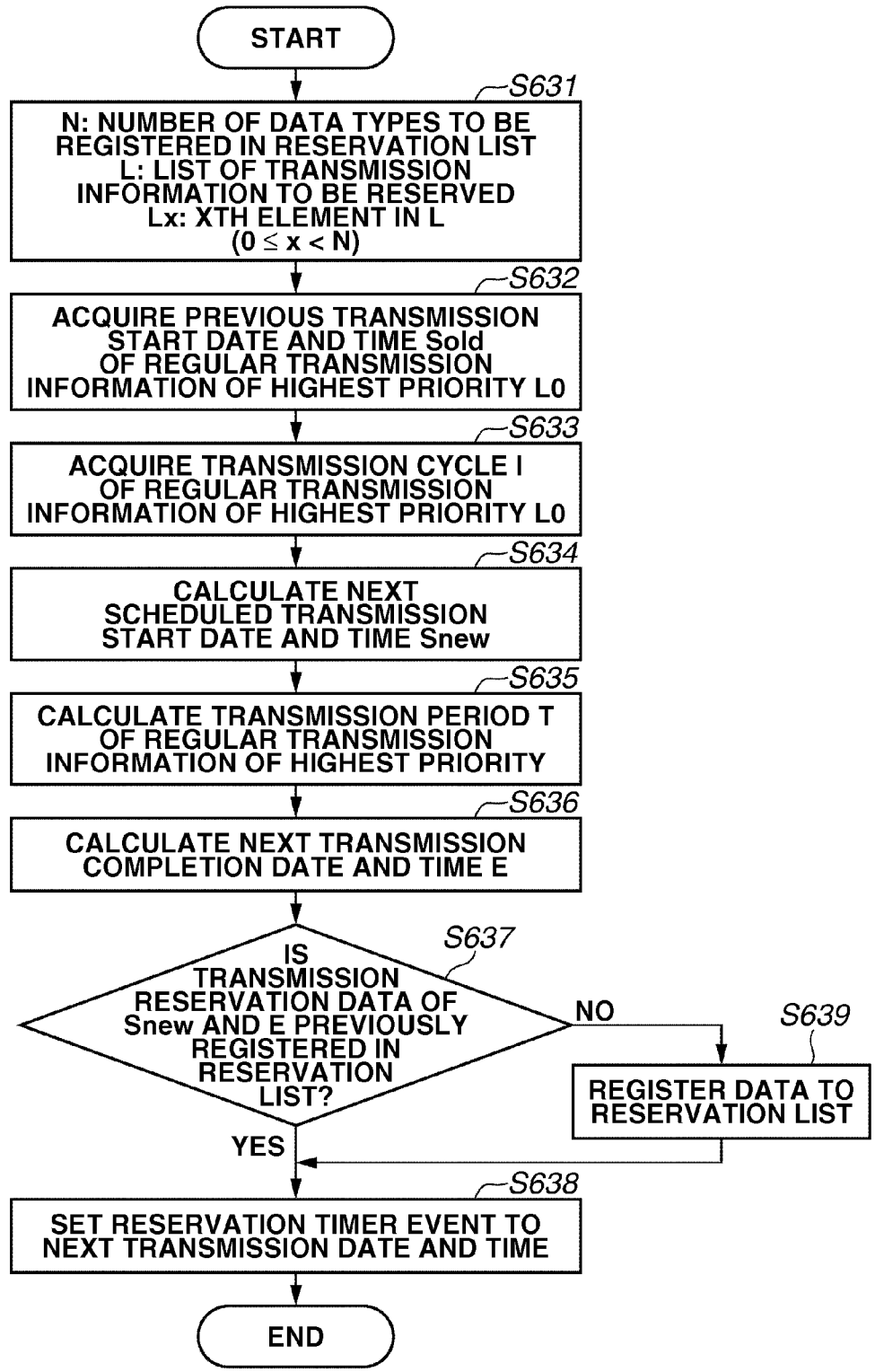

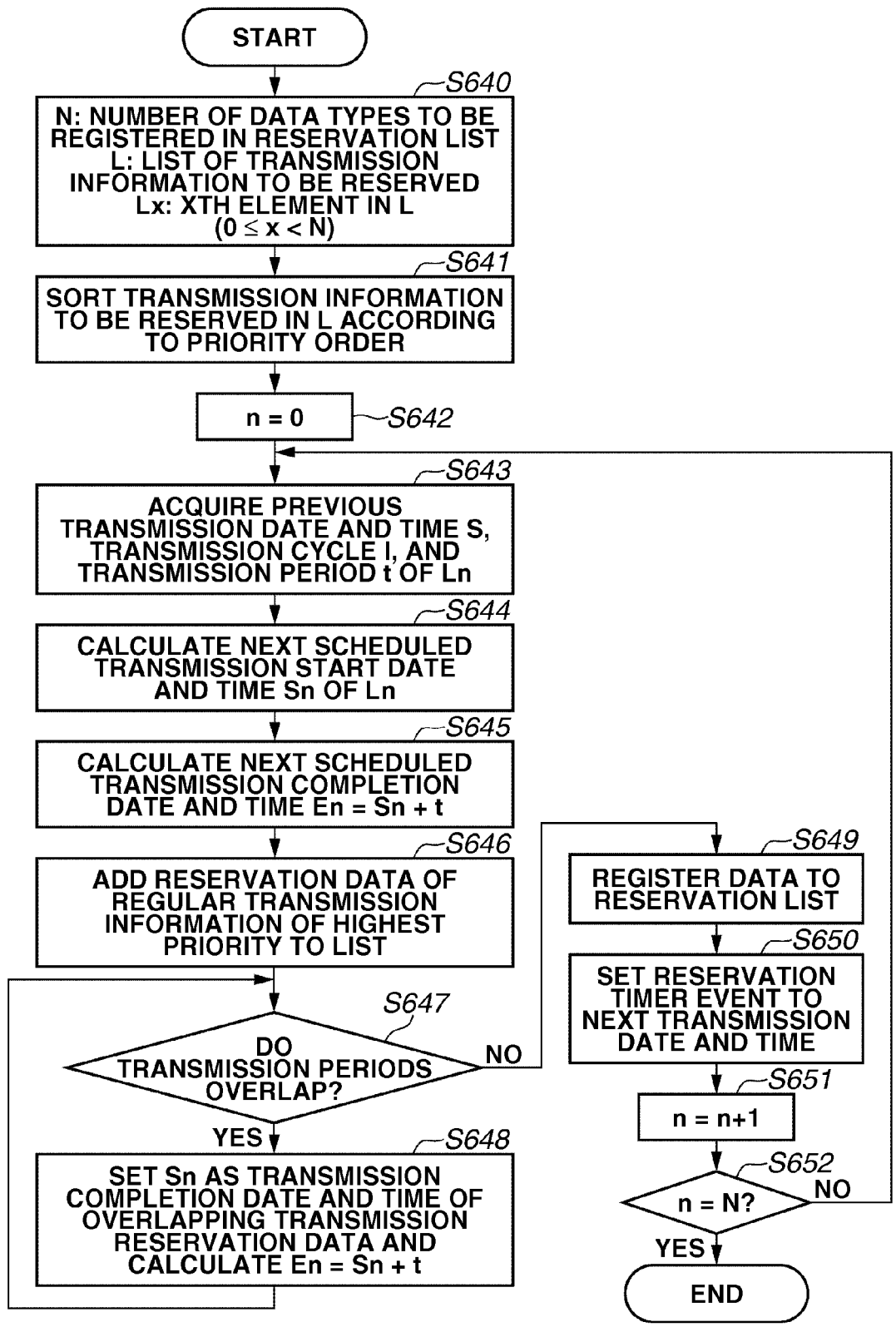

FIG.8

| ID | PRIORITY ORDER | ACQUISITION NECESSITY | DATA TYPE | DATA TRANSMISSION PERIOD | DATA TRANSMISSION CYCLE | INITIAL TRANSMISSION START DATE AND TIME | PREVIOUS TRANSMISSION START DATE AND TIME |
|---|---|---|---|---|---|---|---|
| 101 | — | ○ | CHARGING COUNTER BY DEVICE | 10 MINUTES | 12 HOURS | 2010/4/1 12:00 | — |
| 102 | — | ○ | CHARGING COUNTER BY JOB | 120 MINUTES | 12 HOURS | 2010/4/1 12:00 | — |
| 103 | — | × | CHARGING COUNTER BY USER | 240 MINUTES | 12 HOURS | — | — |
| 110 | 4 | ○ | COUNTER BY FUNCTION | 60 MINUTES | 36 HOURS | 2010/4/1 18:00 | — |
| 120 | 5 | ○ | COMPONENT COUNTER | 20 MINUTES | 16 HOURS | 2010/4/1 19:00 | — |
| 130 | 6 | ○ | FIRMWARE INFORMATION | 10 MINUTES | 7 DAYS | 2010/4/1 20:00 | — |
| 131 | 7 | ○ | HARD DISK INFORMATION | 10 MINUTES | 7 DAYS | 2010/4/1 20:00 | — |
| 132 | 8 | ○ | ENVIRONMENT LOG | 120 MINUTES | 8 HOURS | 2010/4/1 21:00 | — |

INFORMATION PROCESSING APPARATUS AND METHOD THEREOF

BACKGROUND OF THE INVENTION

1. Field of the Invention

The present invention relates to a technique for transmitting information about an image forming apparatus, such as a printer or a copying machine, to a central management apparatus via a network.

2. Description of the Related Art

Currently, a monitoring apparatus collects via a network such as the Internet, device information of an image forming apparatus such as a printer and a copying machine. The device information is then centrally managed and analyzed. The device information includes configuration information and operation information. More specifically, the configuration information includes network information such as an internet protocol (IP) address and a media access control (MAC) address, information on the device type, and a serial number that is unique to the apparatus. Further, the operation information includes various types of counter information such as a number of printouts and a number of times a component is used in the image forming apparatus, failure information, current firmware information, and hard disk information. A central management apparatus collects the configuration information and the operation information directly from the image forming apparatus or via the monitoring apparatus on a local network of the image forming apparatus. The central management apparatus collects various types of configuration information and operation information, according to objective and usage. Transmission of the various types of information is different in whether regular transmission of the information is necessary, immediacy, and transmission data amount.

A portion of the above-described operation information is regularly transmitted based on a schedule that varies according to the type of the information. For example, the counter information used for charging is frequently transmitted (e.g., every other day). The daily counter information is regularly transmitted from the image forming apparatus or the monitoring apparatus to the central management apparatus. Since a time or a date of a deadline for charging is determined for the charging process, it is necessary to regularly transmit the counter information for charging by strictly keeping to the designated date and time. On the other hand, since the firmware information is not frequently updated, the firmware information may be regularly transmitted once a week, and a small delay may be excusable.

Further, immediacy is required in transmission of the failure information. If an error requiring servicing such as a service call occurs in the image forming apparatus, it is necessary to quickly transmit the failure information to the central management apparatus to promptly call a service personnel.

Furthermore, with regard to the transmission data amount, a system that analyzes and counts print tendencies of a large number of users transmits a large amount of data with respect to the operation information. Moreover, in recent years, one monitoring apparatus monitors thousands of image forming apparatuses, so that the data amount to be transmitted increases along with the number of apparatuses to be monitored.

There is a case where a delay in transmission may be generated due to the large amount of data to be transmitted, and it becomes difficult to start transmission strictly on schedule or achieve immediacy. For example, Japanese Patent Application Laid-Open No. 2007-328742 discusses a method for transmitting, when transmitting the charging counter information to the central management apparatus, only the necessary information.

However, since much of the counter information to be used in charging is necessary in performing the charging process, it is desirable to employ a different method that is effective in solving the delay in the transmission on the transmitting side, instead of narrowing down the necessary information. Further, the transmission time of the counter information to be used in charging and the transmission time of the other operation information that are scheduled to be transmitted at different transmission intervals may overlap. In such a case, a delay may be generated in transmitting the charging counter information on the transmission side.

Furthermore, if processing performance of the monitoring apparatus is concentrated on regular transmission of the operation information, a monitoring process for immediately transmitting the failure information may become affected.

SUMMARY OF THE INVENTION

According to an aspect of the present invention, an information processing apparatus which transmits operation information of an image forming apparatus to a management apparatus, using a regular transmission thread for transmitting to the management apparatus operation information to be regularly transmitted, and an event transmission thread for transmitting to the management apparatus operation information indicating an event according to generation of the event in the image forming apparatus, the information processing apparatus includes a management unit configured to manage the operation information of the image forming apparatus, a storing unit configured to store transmission setting information including a time necessary for transmission, a transmission cycle, and a previous transmission start time of each type of the operation information to be regularly transmitted, an activation unit configured to start the regular transmission thread and the event transmission thread, a first registration unit configured to register in a reservation list, with respect to first operation information to be regularly transmitted according to the transmission cycle in the transmission setting information, first transmission reservation data including a transmission start time and a transmission completion time of the first operation information, a second registration unit configured to register in the reservation list, with respect to second operation information that is different than the first operation information, second transmission reservation data including a transmission start time and a transmission completion time of the second operation information that are determined so that the second operation information is regularly transmitted in a different period than the first operation information, wherein the second transmission reservation data is registered in the reservation list after the first transmission reservation data is registered in the reservation list, and a transmission control unit configured to control, when the regular transmission thread activated by the activation unit transmits the first and second operation information, transmission of the first and second operation information to the management apparatus managed by the management unit according to the reservation list.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6A, composed of FIGS. 6A1 and 6A2, is a flowchart illustrating a process performed by a regular transmission thread in the monitoring apparatus.

FIG. 6B is a flowchart illustrating a reservation process performed by the regular transmission thread in the monitoring apparatus.

FIG. 6C is a flowchart illustrating the reservation process performed by the regular transmission thread in the monitoring apparatus.

FIG. 8 illustrates an example of transmission setting information of the operation information.

DESCRIPTION OF THE EMBODIMENTS

Various exemplary embodiments, features, and aspects of the invention will be described in detail below with reference to the drawings.

Figure 1:
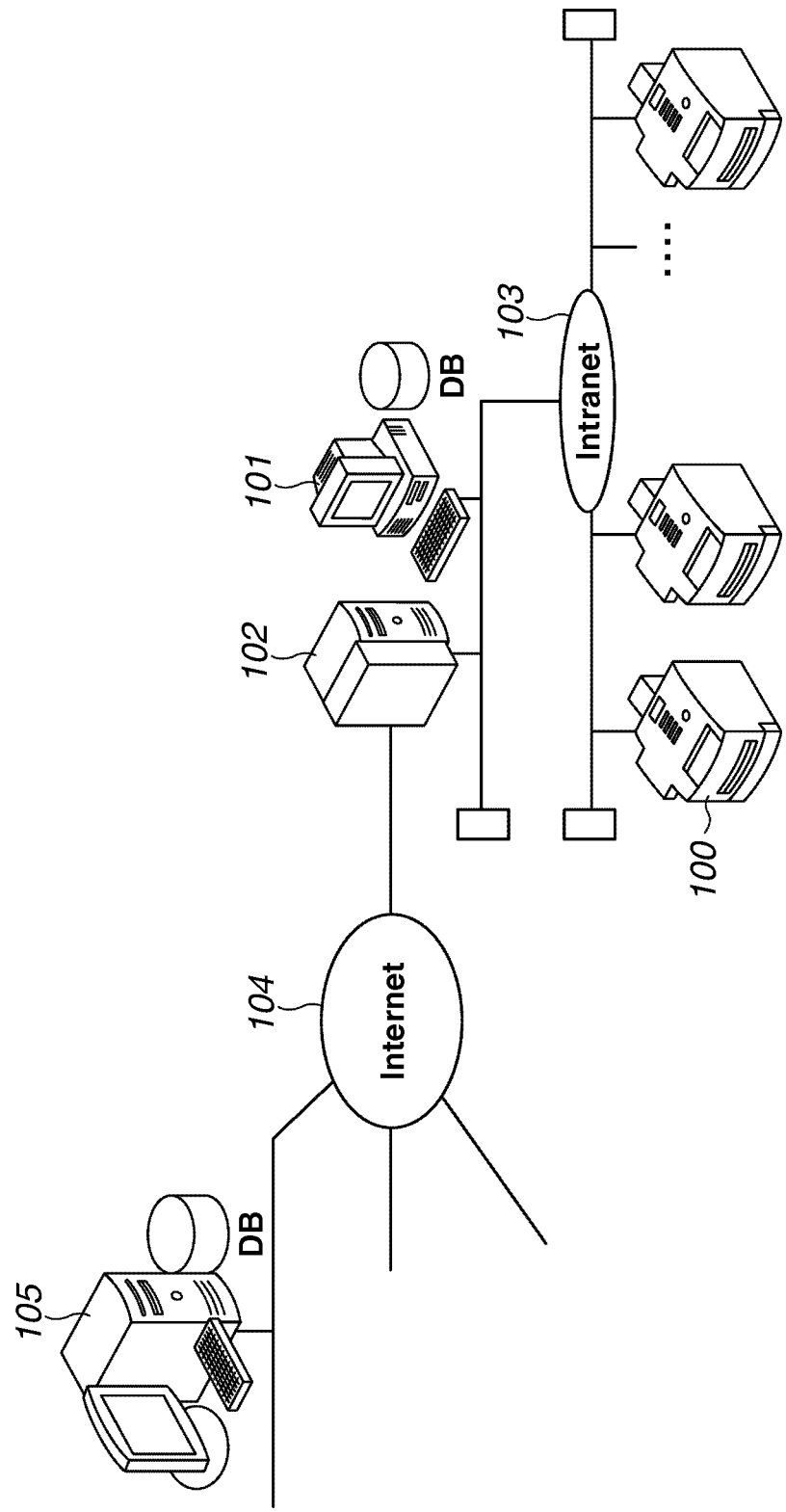
FIG. 1 illustrates a configuration example of a management system according to an exemplary embodiment of the present invention.

FIG. 1 illustrates a plurality of image forming apparatuses, a monitoring apparatus, and a central management apparatus connected on a network. Referring to FIG. 1, image forming apparatuses, e.g., multifunction peripherals (MFP) having a plurality of functions including printing and copying, or single function peripherals (SFP), are connected to an intranet 103 of each local area, such as an in-house network of a customer. The image forming apparatuses are connected to the intranet 103 as devices to be managed. A monitoring apparatus 101 is also connected to the intranet 103 to monitor the image forming apparatuses in the local area. Further, a firewall 102 is set at a connection point with the Internet 104. According to the present invention, it is assumed that a large number of networks of other customers similar to the intranet 103 are connected to the Internet 104.

An image forming apparatus 100 includes a self-monitoring function and can transmit the operation information, such as the counter information and an alarm, to a monitoring device on an external network. According to the present exemplary embodiment, the image forming apparatus 100 transmits the operation information to the monitoring apparatus 101, and the monitoring apparatus 101 then transmits the received operation information to a central management apparatus 105. The image forming apparatus 100 may include a function that the image forming apparatus 100 directly transmits the operation information to the central management apparatus 105, and its setting.

The monitoring apparatus 101 acquires, via the intranet 103, the operation information and the configuration information, such as the device type information and the network information, of the image forming apparatus 100. In acquiring the information, the monitoring apparatus 101 may acquire the information by issuing a request, or the image forming apparatus 100 may voluntarily transmit the information to the monitoring apparatus 101. The monitoring apparatus 101 then stores the acquired information in a storage device therein or a database server (DB server, not illustrated) on the intranet 103, and temporarily manage the acquired information.

Further, the monitoring apparatus 101 regularly transmits to the central management apparatus 105, the counter information and a portion of the operation information such as the firmware information and an environment log, according to a preset schedule. The monitoring apparatus 101 transmits as necessary the failure information in a case where an error has occurred, according to timing at which the error has occurred. Furthermore, the monitoring apparatus 101 transmits to the central management apparatus 105 as necessary, a request from a user operating on an operation panel, i.e., a user interface (UI) in the image forming apparatus, to which the central management apparatus 105 is required to respond.

The central management apparatus 105 communicates with the monitoring apparatus 101 installed on the intranet 103 via the Internet 104 to collect and centrally control the information about the image forming apparatus. The central management apparatus 105 includes the functions for providing services based on the collected information. Such services include displaying a report on the charging counter, notifying the service personnel who performs maintenance of a failure event, calculating consumption levels of the components, and performing inventory management of and delivering consumables (e.g., toner cartridges).

Figure 2:
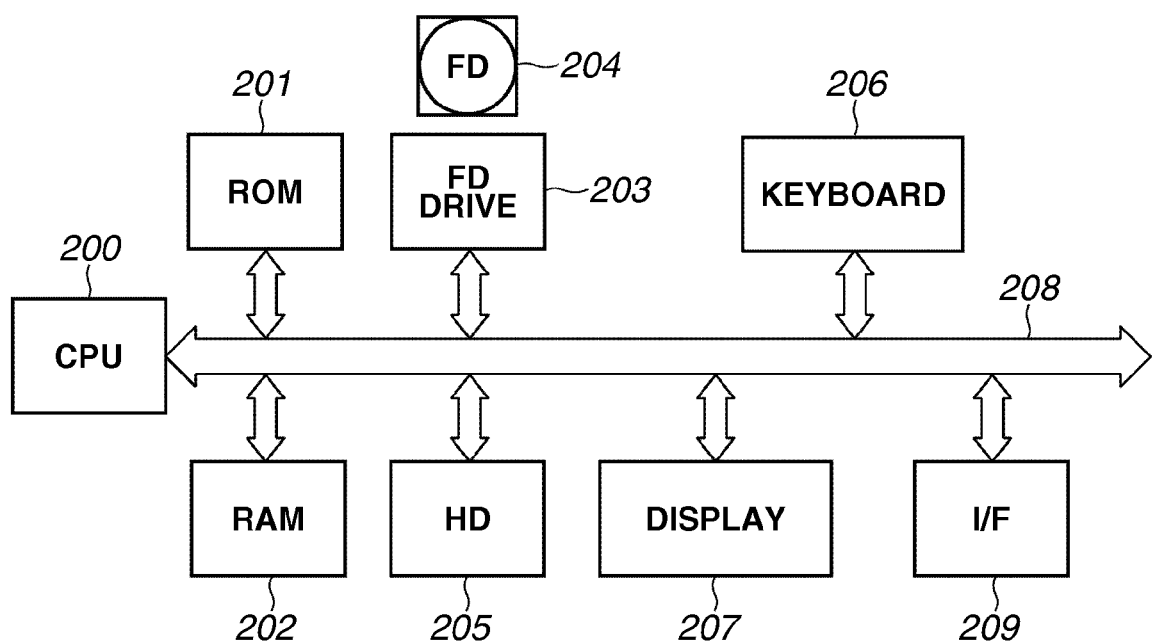
FIG. 2 is a block diagram illustrating an example of an internal configuration of an information processing apparatus according to an exemplary embodiment of the present invention.

FIG. 2 is a block diagram illustrating a configuration of an information processing apparatus according to an exemplary embodiment of the present invention. The information processing apparatus according to the present exemplary embodiment corresponds to the monitoring apparatus 101 or the central management apparatus 105. Further, the monitoring apparatus 101 or the central management apparatus 105 may be an information processing apparatus that does not include components, such as a display, which are not necessary for realizing the present invention.

Referring to FIG. 2, a central processing unit (CPU) 200 performs control of the entire apparatus. The CPU 200 executes application programs, printer driver programs, an operation system (OS), and a network printer control program stored in a hard disk (HD) 205. When executing such a program, the CPU 200 performs control to temporarily store in a random access memory (RAM) 202, information and files that are necessary for executing the program. Processes performed in each of steps illustrated in each of flowcharts to be described below are realized by the CPU 200 executing the processes based on program codes stored in the storage devices, i.e., a read-only memory (ROM) 201, a floppy disk (FD) 204, and the HD 205.

The ROM 201 stores the programs such as a basic input/output (I/O) program, font data used in performing document processing, and various data such as template data. The RAM 202 functions as a main memory and a work area of the CPU 200. A FD drive 203 is a storage medium reading unit, and the programs stored in a FD 204, i.e., a storage medium, can be loaded to the computer system via the FD drive 203. The storage medium is not limited to the FD, but may be a compact disc (CD)-ROM, a CD-R, a CD-R/write (W), a personal computer (PC) card, a digital versatile disc (DVD), an integrated chip (IC) memory card, a magneto-optical disc (MO), or a memory stick. The HD 205, i.e., an external storage unit, stores the application programs, the printer driver programs, the OS, the network printer control program, and related programs.

A display 207 displays commands input by a user using a keyboard 206, and various types of information about the image forming apparatus. A system bus 208 is responsible for data flow inside the information processing apparatus. The information processing apparatus exchanges data with an external device via an interface (I/F) 209, i.e., an I/O unit.

Figure 3:
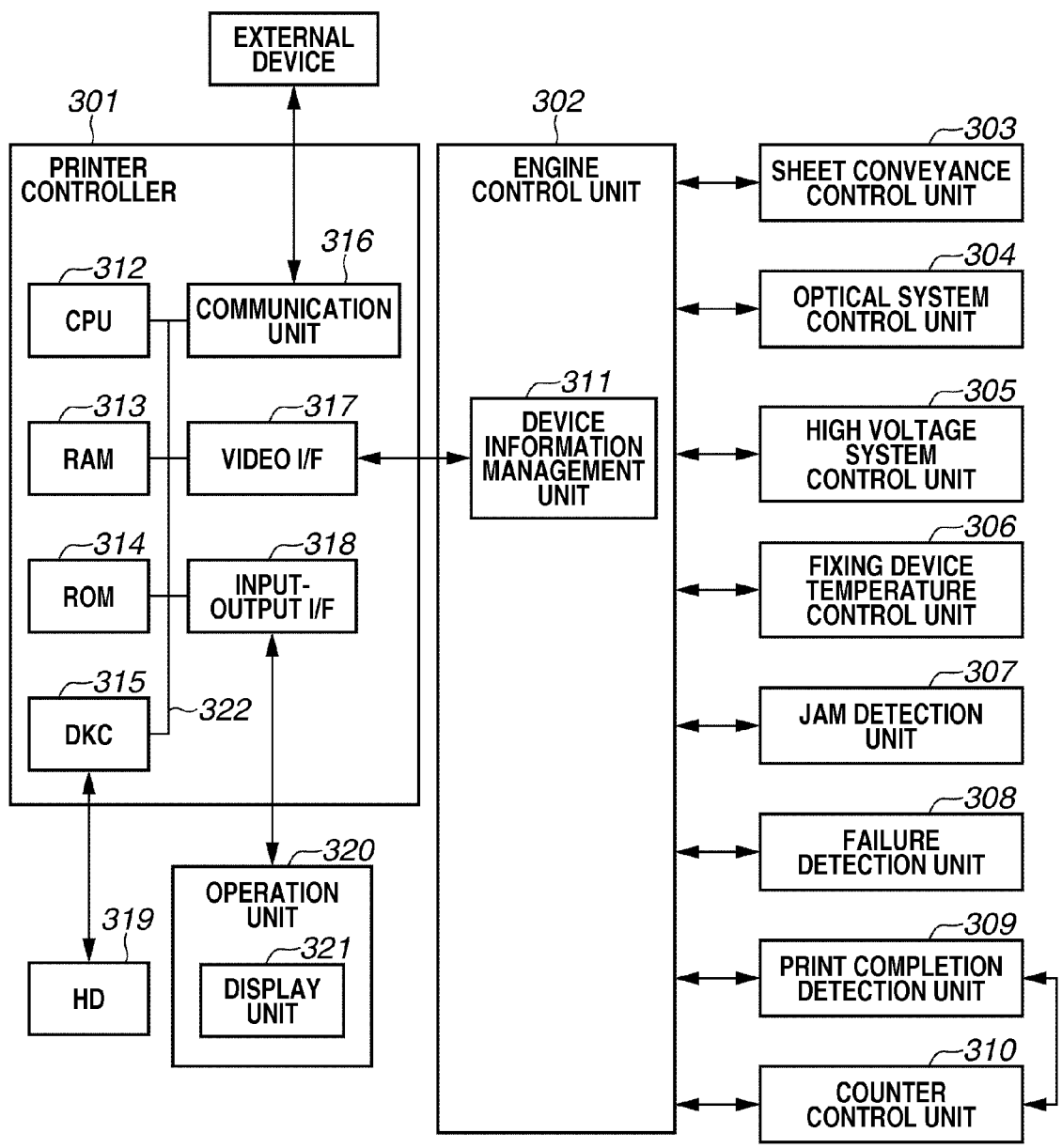
FIG. 3 is a block diagram illustrating an example of an internal configuration of an image forming apparatus according to an exemplary embodiment of the present invention.

FIG. 3 is a block diagram illustrating a configuration of the image forming apparatus 100 according to an exemplary embodiment of the present invention. More specifically, FIG. 3 illustrates a hardware configuration of a printer controller and peripheral components thereof in the image forming apparatus. FIG. 3 illustrates an example in which only the printer engine is connected to the image forming apparatus. However, an image forming apparatus which is connected to a scanner engine and provides a scanning function or a copying function is applicable to the present invention.

Referring to FIG. 3, a printer controller 301 includes a communication unit 316 for transmitting and receiving various data to and from an external device (i.e., the monitoring apparatus 101) using a predetermined protocol. Further, the printer controller 301 includes a video I/F 317 for receiving image data, and transmitting and receiving signals and performing serial communication with a printer engine control unit 302 when printing the received image data. A CPU 312 in the image forming apparatus collectively controls access to various devices connected to a system bus 322, based on the control program stored in a ROM 314 or an HD (i.e., an external memory) 319. The CPU 312 also outputs the image signal, i.e., output information, to a printer engine connected via the video I/F 317. A RAM 313 functions as a main memory and a work area for the CPU 312. A memory controller (DKC) 315 controls access to the external memory 319 such as the HD or the FD that stores a boot program, various applications, font data, a user file, and an editing file. An operation unit 320, including a display panel 321 and a keyboard, provides information to an operator or causes the operator to input instructions via an input-output I/F 318.

The engine control unit 302 transmits and receives signals to and from the printer controller, and controls each unit in the printer engine via serial communication. A sheet conveyance control unit 303 conveys sheets to be printed on and discharges the sheets after printing based on an instruction from the engine control unit 302. An optical system control unit 304 drives a scanner motor and performs on/off control of a laser, based on the instruction from the engine control unit 302. A high voltage system control unit 305 outputs high voltage necessary for performing an electrophotographic process such as charging, developing, and transferring based on the instruction form the engine control unit 302. A fixing device temperature control unit 306 performs temperature control of a fixing device based on the instruction from the engine control unit 302, and detects abnormalities in the fixing device. A jam detection unit 307 detects a conveyance failure when the sheet is being conveyed, and a failure detection unit 308 detects a failure in a functional unit in the printer. A print completion notification unit 309 detects and notifies the engine control unit 302 that printing has been normally performed. A counter control unit 310 updates various types of counter information after printing is performed.

The engine control unit 302 includes a device information management unit 311 that manages information about each unit in the printer engine. For example, the device information management unit 311 acquires, according to a request from the external device 322, the counter information from the counter control unit and transmits the counter information to the video I/F 317. The counter information is thus transmitted to the external device via the video I/F 317 and the communication unit 316. If the external device issues other information acquisition requests, the device information management unit 311 acquires the information from each unit as necessary. Further, the device information management unit 311 manages the jam information notified from the jam detection unit 307 and the failure information notified from the failure detection unit 308. Such information is transmitted to the external device via the video I/F 317.

The image forming apparatus according to an exemplary embodiment of the present invention is applicable to a laser beam printer using the above-described electrophotographic method, an inkjet printer using an inkjet method, a thermal head printer using a heat-transfer method, or a copying machine.

Figure 4:
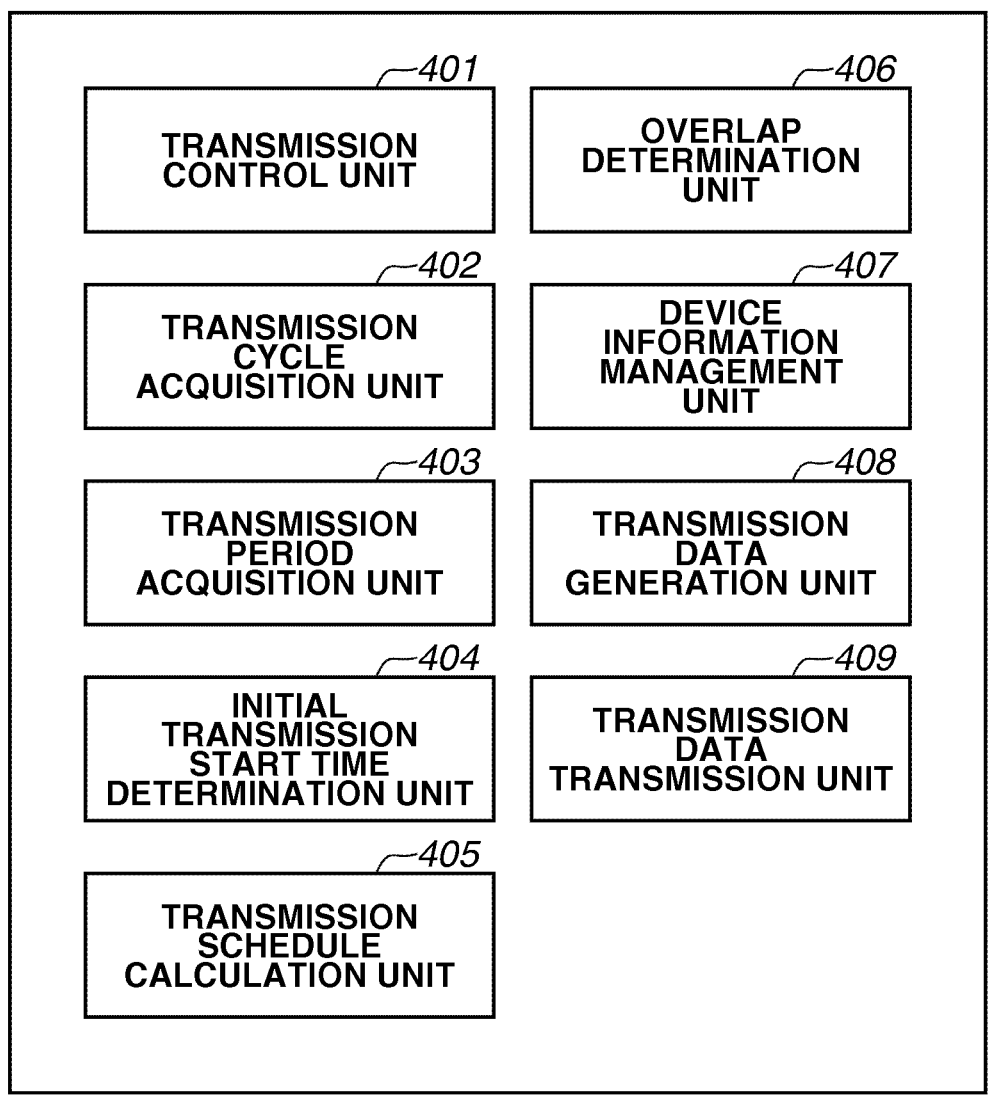
FIG. 4 is an example of a module configuration of the information processing apparatus.

FIG. 4 illustrates a configuration example of functional modules included in the monitoring apparatus 101 according to an exemplary embodiment of the present invention. Each of the components illustrated in FIG. 4 is a logical component that is realized by the CPU 200 illustrated in FIG. 2 reading and executing the control program stored in a non-volatile storing unit such as the ROM or the HD. The configuration illustrated in FIG. 4 mainly performs the processes in the descriptions of the flowcharts illustrated in FIGS. 5, 6A-C, and 7A-C. However, the CPU 200 physically performs the processes.

As described above, the monitoring apparatus 101 previously manages the transmission setting information such as a schedule to be used when transmitting a portion of the operation information. The monitoring apparatus 101 may store and manage the transmission setting information in the storing unit included therein, or in the DB server (not illustrated) in the intranet 103. FIG. 8 illustrates a table where a concrete example of the transmission setting information is shown. The table manages an identification (ID) number, a priority order, an acquisition necessity of the information, a data type, a data transmission period, a data transmission cycle, and a previous transmission start date and time, which are assigned to each type of transmission information. Further, the information about whether the data is to be immediately retransmitted when regular transmission has failed is set for each type of the transmission information. If the regular transmission has failed to transmit the transmission information, which is not to be retransmitted, such information is transmitted again in the next regular transmission.

Referring to FIG. 8, an "ID" is a unique number that is used in data management. A "priority order" is determined based on an order of significance of the data, and is used when a transmission period is to be changed in a case where a plurality of types of transmission information is to be processed at the same time. According to the present exemplary embodiment, the charging counter information used in charging is information to be transmitted with highest priority according to the transmission cycle (i.e., first operation information). Transmission control performed on the charging counter information is thus different than that performed on the other transmission information, so that the priority order is not assigned to the charging counter information on the same basis as the other information.

A "data transmission period" is an estimate of the time that elapses when once transmitting the transmission information. For example, such information is a value calculated based on a number of image forming apparatuses to be monitored, and a setting file indicating the period for transmitting the transmission information per one image forming apparatus which is previously managed. The "data transmission period" is managed to be rewritable.

A "data transmission cycle" indicates a cycle for performing regular transmission. An "initial transmission start date and time" sets the date and time at which the data is to be initially transmitted to the central management apparatus 105. According to the present exemplary embodiment, the transmission schedules including the "data transmission cycle" and the "initial transmission start date and time" are acquired from the central management apparatus 105. A "previous transmission date and time" is used for recording a previous transmission starting date and time. Since the data is not yet transmitted in an initial state, "—(disable)" is set to the "previous transmission date and time".

According to the present exemplary embodiment, the user may input the "data transmission cycle" and the "initial transmission start date and time" from the UI in the monitoring apparatus or by using an initial setting file.

The functional modules illustrated in FIG. 4 will be described in detail below. A transmission control unit 401 manages a reservation list (refer to FIG. 9) used for performing transmission control of the operation information that is to be regularly transmitted, according to the present invention. The transmission control unit 401 then determines the transmission schedule and performs transmission control of the operation information. More specifically, the transmission control unit 401 refers to a scheduled date and time of the next transmission start and completion, calculated by a transmission schedule calculation unit 405. The transmission control unit 401 then determines the next transmission start date and time for each of the plurality of types of operation information regularly transmitted to the management apparatus 105. In particular, the transmission start date and time of the charging counter information is determined with highest priority. The transmission start date and time of the other information that is to be regularly transmitted is then determined. The process will be described in detail below.

A transmission cycle acquisition unit 402 acquires the transmission cycle from the table defined as illustrated in FIG. 8. A transmission period acquisition unit 403 acquires the data transmission period from the table defined as illustrated in FIG. 8. An initial transmission start time determination unit 404 acquires the initial transmission start date and time from the table defined as illustrated in FIG. 8 and determines the initial transmission period of the transmission information. The transmission schedule calculation unit 405 calculates the scheduled date and time at which the next data transmission is to be started, based on the initial transmission start date and time (or the previous transmission start date and time) and the data transmission cycle. Further, the transmission schedule calculation unit 405 calculates the scheduled date and time at which the next data transmission will be completed, based on the next data transmission start date and time and the data transmission period.

An overlap determination unit 406 determines whether there are types of operation information whose transmission periods between the scheduled transmission start time and a completion time overlap. The overlap determination unit 406 performs such determination when the transmission start time of the operation information to be regularly transmitted other than the charging counter information is to be determined.

A device information management unit 407 controls acquisition of the configuration information and the operation information from the image forming apparatus, and stores and manages the acquired device information in the storage device. The information managed by the device information management unit 407 is transmitted to the central management apparatus 105.

A transmission data generation unit 408 acquires, when the operation information is to be regularly or immediately transmitted, the device information to be transmitted from the device information management unit 407. The transmission data generation unit 408 then generates the transmission data of a predetermined transmission format. The transmission format at least includes the information indicating that the data is to be regularly transmitted, and the configuration information of the image forming apparatus. A transmission data transmission unit 409 transmits to the central management apparatus 105 at the transmission start time determined by the transmission control unit 401, the transmission data generated by the transmission data generation unit 408. Further, if there is a notification that a failure has occurred in the image forming apparatus, the transmission data generation unit 408 immediately generates the transmission data of the failure information. The transmission data transmission unit 409 then transmits the generated data.

The flowcharts of FIGS. 5, 6A-C, and 7A-C illustrate processes performed by the monitoring apparatus 101. Each of the steps in the flowcharts according to the present exemplary embodiment is realized by the CPU in the monitoring apparatus 101 reading and executing the control programs stored in the non-volatile storing unit such as the ROM and the HD.

The process for performing transmission control of the device information by the monitoring apparatus 101 according to an exemplary embodiment of the present invention will be described below with reference to FIG. 5. In the process illustrated in FIG. 5, the monitoring apparatus 101 acquires as necessary the device information (in particular, the operation information) from the image forming apparatus. The device information management unit 407 illustrated in FIG. 4 manages the acquired device information.

In step S501, upon the user switching on the apparatus, the transmission control unit 401 initializes the system. More specifically, the transmission control unit 401 initializes variables by reading the information table storing the previously registered device information. In step S502, the transmission control unit 401 determines, as part of the initialization process, whether the transmission setting information has been acquired from the central management apparatus 105.

If the transmission setting information has not been acquired from the central management apparatus 105 (NO in step S502), the process proceeds to step S524. In step S524, the transmission control unit 401 determines whether a communication setting for communicating with the central management apparatus 105 has been completed. If the transmission control unit 401 determines that the communication setting for communicating with the central management apparatus 105 has not been completed (NO in step S524), the transmission control unit 401 stands by until the communication setting is completed. On the other hand, if the transmission control unit 401 determines that the communication setting for communicating with the central management apparatus 105 has been completed (YES in step S524), the process proceeds to step S525. In step S525, the transmission control unit 401 acquires the transmission setting information from the central management apparatus 105. The process then returns to step S502.

If the transmission setting information has been acquired from the central management apparatus 105 (YES in step S502), the process proceeds to step S503. In step S503, the transmission control unit 401 starts a regular transmission thread, an event transmission thread, and a re-transmission thread. When the initialization process from step S501 to step S503 is completed, the monitoring apparatus 101 enters a loop in which a process is performed with respect to the request from the external device and information is acquired from the image forming apparatus.

According to the present invention, a plurality of threads can be activated for transmitting the information to the external device, depending on a processing power of the monitoring apparatus 101. The monitoring apparatus 101 can perform in parallel, using the activated plurality of threads, the process for transmitting a plurality of types of information. The present invention realizes a process so that a transmission load does not become excessively high when using the plurality of threads, i.e., the regular transmission thread, the event transmission thread, the re-transmission thread, and the immediate transmission thread, as will be described in detail below.

In step S504, the transmission control unit 401 determines whether there is a request issued to the central management apparatus 105 to change the transmission setting information. Such a request may be issued from the user using the UI of the monitoring apparatus or the image forming apparatus, or from the central management apparatus. If the transmission control unit 401 determines that there is no such request (NO in step S504), the process proceeds to step S511. If the transmission control unit 401 determines that there is such a request (YES in step S504), the process proceeds to step S505.

In step S505, the transmission control unit 401 acquires the transmission setting information from the central management apparatus. In step S506, the transmission control unit 401 determines whether the transmission setting information has been successfully acquired. If the transmission control unit 401 determines that the transmission setting information has been successfully acquired (YES in step S506), the process proceeds to step S507. In step S507, the transmission control unit 401 issues a suspension request to the regular transmission thread. In step S508, the transmission control unit 401 stands by until the thread is suspended. If the thread becomes suspended (YES in step S508), the process proceeds to step S509. In step S509, the transmission control unit 401 restarts the regular transmission thread. The process then returns to step S504. If the transmission control unit 401 determines that the transmission setting information has not been successfully acquired (NO in step S506), the process proceeds to step S510. In step S510, the transmission control unit 401 returns an error response to a requestor of the schedule change. The process then returns to step S504. The process performed by the regular transmission thread will be described in detail below with reference to FIG. 6.

In step S511, the transmission control unit 401 determines whether a request that is to be immediately transmitted to the central management apparatus 105 has been received. According to the present example, such a request is a type of data other than the failure information of an event that is notified from the image forming apparatus, such as an error or an alert occurrence, and a warning that there is a small amount of or no toner remaining. More specifically, the request described in step S511 is a request to which it is necessary to return as quickly as possible a response including a result of a process performed according to the request. For example, if the user has pressed a repair request button on the image forming apparatus, it is necessary to quickly acquire a response including the result on whether the central management apparatus 105 has correctly received the request. Since it is an explicit service request from the user, it is highly possible that there is a failure which may directly cause a down time of the image forming apparatus and which only the user is aware of. It thus becomes necessary to properly manage the response to the failure.

If the transmission control unit 401 determines that a request to be immediately transmitted to the central management apparatus 105 has not been received (NO in step S511), the process proceeds to step S517. On the other hand, if the transmission control unit 401 determines that a request to be immediately transmitted to the central management apparatus 105 has been received (YES in step S511), the process proceeds to step S512. In step S512, the device information management unit 407 stores the received data. In step S513, the transmission control unit 401 acquires the number of immediate transmission threads that are currently activated, and an upper limit of the number of immediate transmission threads that can be activated by the monitoring apparatus. According to the present invention, the upper limit of the number of immediate transmission threads may be arbitrarily set. For example, a default value of the upper limit may be set to 2, and be stored and used as an environment setting file.

In step 514, the transmission control unit 401 determines whether the number of immediate transmission threads that are currently being activated is less than the upper limit. If the number of immediate transmission threads that are currently being activated is less than the upper limit (YES in step S514), the process proceeds to step 515. In step S515, the transmission control unit 401 starts a new immediate transmission thread. On the other hand, if the number of immediate transmission threads that are currently being activated is not less than the upper limit (NO in step S514), the process proceeds to step S516. In step S516, the transmission control unit 401 generates the error information, and returns the response to the requestor via the transmission data transmission unit 409. The process performed by the immediate transmission thread will be described in detail below with reference to FIG. 7A.

In step S517, the transmission control unit 401 determines whether event data has been received. The event data includes a service call, a jam/alert occurrence, and failure information such as a small amount of toner remaining, notified from the image forming apparatus to the monitoring apparatus 101. The event data is information that is necessary to be immediately transmitted to the central management apparatus 105. However, it is not necessary for the central management apparatus 105 to return a response to the image forming apparatus.

If the transmission control unit 401 determines that the event data has not been received (NO in step S517), the process proceeds to step S520. If the transmission control unit 401 determines that the event data has been received (YES in step S517), the process proceeds to step S518. In step S518, the device information management unit 407 stores the received event data. In step S519, the transmission control unit 401 registers the received event data in a transmission list of the event transmission thread. According to the present invention, a queue method is employed with respect to the transmission list for managing the event data to be transmitted. However, the transmission list may employ a management method for controlling a transmission order according to a degree of urgency, instead of the queue method. The event data registered in the transmission list is sequentially then transmitted using the event transmission thread activated in step S503.

In step S520, the transmission control unit 401 determines whether a system suspension request has been detected. If the transmission control unit 401 determines that the system suspension request has been detected (YES in step S520), the process proceeds to step S521. In step S521, the transmission control unit 401 issues the suspension request to all transmission threads that are being activated. In step S522, the transmission control unit 401 stands by until all of the threads have been suspended, and if all threads have been suspended, the process proceeds to step S523. In step S523, the transmission control unit 401 performs other end processing, and the process ends.

The process performed by the regular transmission thread will be described below with reference to FIGS. 6A, 6B, and 6C. As described above, the regular transmission thread is started when the system is initialized and ends when the system is suspended.

In step S601 illustrated in FIG. 6A, upon start of the regular transmission thread, the transmission control unit 401 initializes the thread. More specifically, as part of the initialization process, the transmission control unit 401 initializes the reservation list that stores transmission reservation data.

Figure 9:
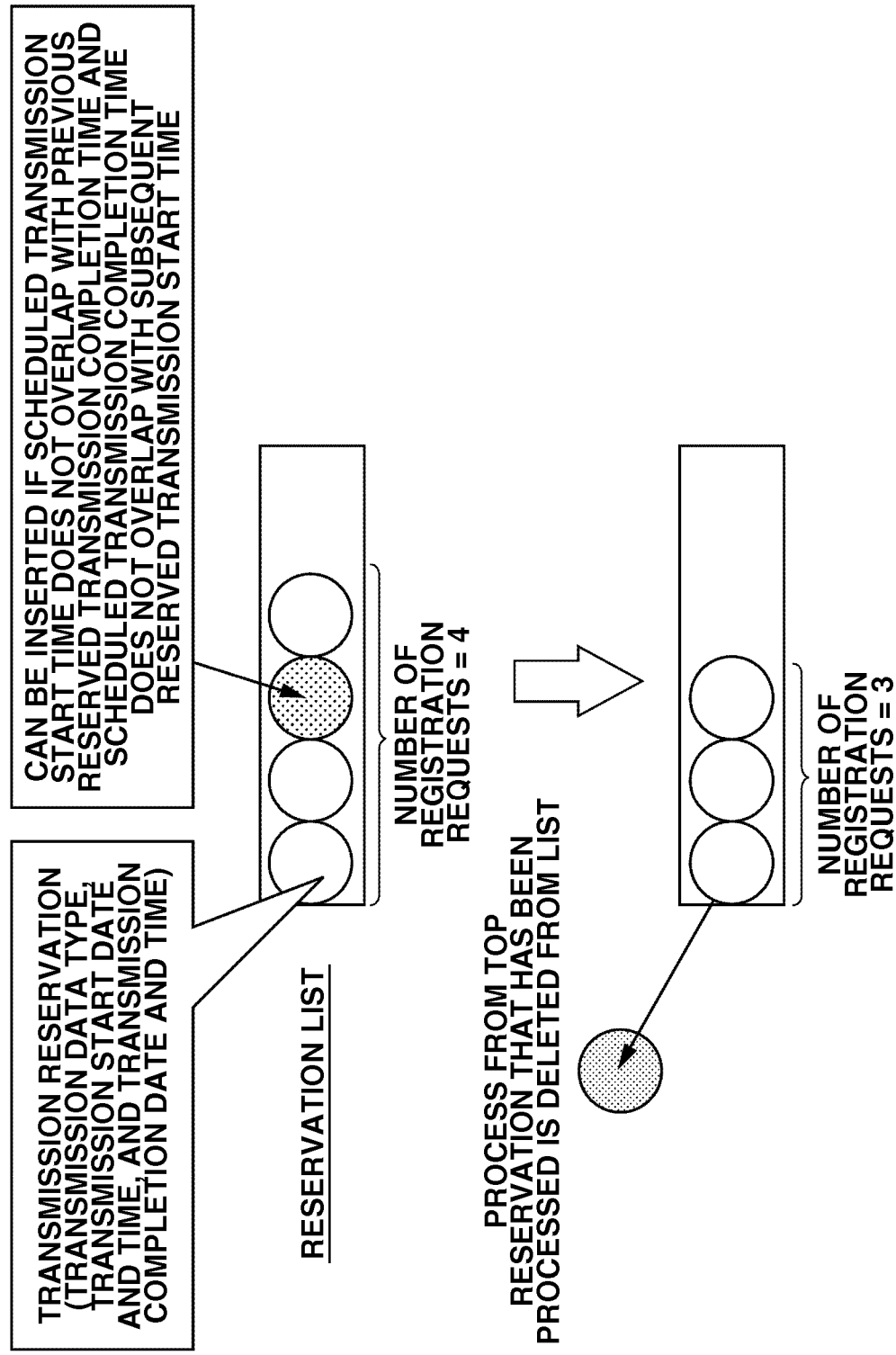
FIG. 9 illustrates a reservation list.

The reservation list is a non-repeating bidirectional list illustrated in FIG. 9. Referring to FIG. 9, the transmission reservation data registered in the reservation list at least contains the data type, the transmission start date and time, and the transmission completion date and time, as attribute information. Further, if the transmission reservation data is to be newly registered to the reservation list, the transmission control unit 401 confirms whether the scheduled transmission start/completion time and date of the transmission reservation data to be registered overlap with a period for transmitting the reservation transmission data previously registered in the reservation list. The period for transmitting the reservation transmission data is a period between the transmission start date and time and the transmission complete date and time thereof. If the periods do not overlap, the transmission reservation data can be newly registered to the reservation list. Furthermore, since the transmission reservation data is arranged in a chronological order in the reservation list, the data is processed from the top, and the processed transmission reservation data is deleted from the reservation list. If the transmission reservation data is processed, the operation information designated by the data type of the transmission reservation data becomes regularly transmitted to the central management apparatus 105.

In step S602, the transmission control unit 401 performs the transmission reservation process of the transmission information that is regularly transmitted with highest priority. The process will be described below with reference to FIG. 6B. In step S603, the transmission control unit 401 performs the reservation process of the transmission information to be regularly transmitted, other than the transmission information to be regularly transmitted with highest priority. The process will be described below with reference to FIG. 6C.

In step S604, the transmission control unit 401 stands by until the next regular transmission timer event is generated, i.e., until the regular transmission start time of the information to be regularly transmitted is reached. If the regular transmission timer event is generated (YES in step S604), the process proceeds to step 605. In step S605, the transmission control unit 401 acquires the transmission reservation data at the top of the reservation list.

In step S606, the transmission control unit 401 determines whether the acquired transmission reservation data designates the transmission data to be regularly transmitted with highest priority. If the acquired transmission reservation data does not designate the transmission data to be regularly transmitted with highest priority (NO in step S606), the process proceeds to step S615. On the other hand, if the acquired transmission reservation data designates the transmission data to be regularly transmitted with highest priority (YES in step S606), the process proceeds to step S607.

In step S607, the transmission data generation unit 408 acquires from the device information management unit 407 the operation information of the data type designated by the transmission reservation data acquired by the transmission control unit 401. The transmission data generation unit 408 then generates the transmission data according to the predetermined format for regular transmission. In step S608, the transmission data transmission unit 409 transmits to the central management apparatus 105 the transmission data generated by the transmission data generation unit 408.

In step S609, the transmission control unit 401 determines whether the regular transmission is successful. If the regular transmission is successful (YES in step S609), the process proceeds to step S610. In step S610, the transmission control unit 401 records the date and time of the successful transmission in the "previous transmission start date and time" of the transmission setting information illustrated in FIG. 8. In step S611, the transmission control unit 401 then performs the transmission reservation process of the transmission information to be regularly transmitted with highest priority for the next regular transmission. On the other hand, if the regular transmission is not successful (NO in step S609), the process proceeds to step S612.

In step S612, the transmission control unit 401 determines whether the operation information that was to be transmitted in the unsuccessful transmission is data to be retransmitted. If the operation information is data to be retransmitted (YES in step S612), the process proceeds to step S613. In step S613, the transmission control unit 401 enters in a retransmission list retransmission reservation data including the information about the transmission data. More specifically, the retransmission data includes a transmission data type, a retransmission interval that is different for each data type, and a maximum number of retransmissions. The retransmission reservation data is managed by being associated with the transmission data whose regular transmission has been unsuccessful. Retransmission of the transmission data will be described below in the process related to the retransmission thread (illustrated in FIG. 7C). If the operation information is not data to be retransmitted (NO in step S612), the process proceeds to step S614. In step S614, the transmission control unit 401 outputs an error log, and the process proceeds to step S611.

In step S615, the transmission control unit 401 determines whether the transmission reservation data acquired in step S605 designates the transmission information other than that to be regularly transmitted with highest priority. If the transmission reservation data is not transmission information other than that to be regularly transmitted with highest priority (NO in step S615), the process proceeds to step S624. If the transmission reservation data is transmission information other than that to be regularly transmitted with highest priority (YES in step S615), the process proceeds to step S616. In step S616, the transmission data generation unit 408 acquires from the device information management unit 407 the operation information of the data type designated by the transmission reservation data acquired by the transmission control unit 401. The transmission data generation unit 408 then generates the transmission data according to the predetermined format for performing regular transmission. In step S617, the transmission data transmission unit 409 transmits to the central management apparatus 105 the transmission data generated by the transmission data generation unit 408.

In step S618, the transmission control unit 401 determines whether the regular transmission is successful. If the regular transmission is successful (YES in step S618), the process proceeds to step S619. In step S619, the transmission control unit 401 records the date and time of the successful transmission in the "previous transmission start date and time" of the transmission setting information illustrated in FIG. 8. In step S620, the transmission control unit 401 performs the transmission reservation process with respect to the regularly transmitted transmission information other than the transmission information that is regularly transmitted with highest priority for the next regular transmission.

On the other hand, if the regular transmission is not successful (NO in step S618), the process proceeds to step S621. In step S621, the transmission control unit 401 determines whether the operation information that was to be transmitted in the unsuccessful transmission is data to be retransmitted. If the operation information is data to be retransmitted (YES in step S621), the process proceeds to step S622. In step S622, the transmission control unit 401 enters in the retransmission list the retransmission reservation data including the information about the transmission data. If the operation information is not data to be retransmitted (NO in step S621), the process proceeds to step S623. In step S623, the transmission control unit 401 outputs an error log.

In step S624, the transmission control unit 401 determines whether a thread suspension request has been detected. If the thread suspension request has been detected (YES in step S624), the process proceeds to step S625. In step S625, the transmission control unit 401 performs end processing of the thread and ends the regular transmission thread.

The transmission reservation process with respect to the transmission information to be regularly transmitted with highest priority will be described below with reference to FIG. 6B. According to the present invention, an example of the transmission information to be regularly transmitted with highest priority (i.e., the first operation information) is the charging counter information (i.e., the information indicated by IDs 101, 102, and 103 illustrated in FIG. 8).

In step S631, the transmission control unit 401 initializes constants and variables to be used in performing the process. According to the process illustrated in FIG. 6B, a number of data types of the transmission information to be registered in the reservation list is indicated as N, a list for temporarily managing the transmission information to be registered in the reservation list as L, and an xth element in the list L as Lx. Further, x is greater than or equal to 0 and less than N.

Referring to FIG. 8, it is not necessary to acquire the transmission information of the data type ID 103. In the process illustrated in FIG. 6B, the elements of the list L thus become the charging counter by device, i.e., ID 101, and the charging counter by job, i.e., ID 102, so that N becomes 2. The two elements in the list L will be respectively referred to as L0, i.e., the charging counter for each device, and L1, i.e., the charging counter by job. Since the two types of transmission information are the operation information to be transmitted with highest priority at the same time, the data transmission cycle and the initial transmission start date and time are set to be the same. If there is counter information that is not necessary to be transmitted with highest priority, the priority order of the data type can be set to an appropriate value in FIG. 8. The data can thus be excluded from the data to be regularly transmitted with highest priority.

In step S632, the transmission control unit 401 refers to the transmission setting information illustrated in FIG. 8, and acquires a previous transmission start date and time Sold of the transmission information L0 to be regularly transmitted with highest priority. For example, if the data has not yet been transmitted as illustrated in FIG. 8, Sold becomes the initial transmission start date and time determined by the initial transmission start date and time determination unit 404. In step S633, the transmission control unit 401 refers to the transmission setting information illustrated in FIG. 8 and acquires a transmission cycle I of the transmission information L0 that is to be regularly transmitted with highest priority. According to the present example, the transmission cycle I of the charging counter by device, i.e., L0, is 12 hours.

In step S634, the transmission schedule calculation unit 405 calculates next scheduled transmission start date and time Snew of the transmission information L0 that is to be regularly transmitted with highest priority. For example, the next scheduled transmission start date and time of initial regular transmission is calculated from the initial transmission date and time. In such a case, the next scheduled transmission start date and time Snew is a time in the future that is closest to the current time, acquired by adding an integral multiple of the transmission cycle I to the initial transmission date and time. An equation for calculating Snew is described as follows, in which Tnow indicates the current time and % indicates a remainder operator.

$$Snew=(Tnow-((Tnow-Sold)\%I))/I+I$$

Since the previous transmission date and time becomes managed after the transmission is completed, the previous transmission start date and time Sold can be acquired for subsequent regular transmissions. If Sold can be acquired, the next scheduled transmission start date and time Snew can then be calculated using the following equation.

$$Snew=Sold+I$$

In step S635, the transmission schedule calculation unit 405 acquires the transmission periods of the transmission information that is to be regularly transmitted with highest priority to be reserved. The transmission schedule calculation unit 405 then calculates a sum of the acquired transmission periods. The sum will be referred to as T, i.e., a transmission period of the transmission information that is to be regularly transmitted with highest priority. According to the present example, since T is the sum of the transmission period of the charging counter by device (i.e., 10 minutes) and the charging counter by job (i.e., 120 minutes), T becomes 130 minutes.

In step S636, the transmission schedule calculation unit 405 calculates a scheduled completion date and time of the next transmission E, using the following equation.

$$E=Snew+T$$

In step S637, the transmission control unit 401 refers to each element in the reservation list L. The transmission control unit 401 then determines whether the transmission reservation data including the calculated scheduled transmission start date and time Snew and a scheduled transmission completion date and time E are previously registered in the reservation list. If the transmission reservation data is previously registered in the reservation list (YES in step S637), the process proceeds to step S638. In step S638, the transmission control unit 401 sets a reservation timer event to the next scheduled transmission start date and time. The process then ends. The transmission reservation data becomes registered in the reservation list when the reservation process of step S646 illustrated in FIG. 6C to be described below is performed. If the transmission reservation data is not yet registered in the reservation list (NO in step S637), the process proceeds to step S639. In step S639, the transmission control unit 401 registers the transmission reservation data in an appropriate position in the reservation list. The transmission reservation data includes, as the attribute information, the scheduled transmission start date and time Snew and the scheduled transmission completion date and time E calculated in the above-described process. The process then proceeds to step S638.

The process for reserving the regularly transmitted transmission information other than the transmission information that is regularly transmitted with highest priority (i.e., the second operation information) will be described below with reference to FIG. 6C.

In step S640, the transmission control unit 401 initializes the constants and the variables to be used in performing the process. According to the process illustrated in FIG. 6C, the number of data types of the transmission information to be registered in the reservation list is indicated as N, the list for temporarily managing the transmission information to be registered in the reservation list as L, and the xth element in the list L as Lx. Further, x is greater than or equal to 0 and less than N. For example, the transmission information to be processed according to the flowchart illustrated in FIG. 6C corresponds to the transmission information indicated by IDs 110, 120, 130, 131, and 132 in the table illustrated in FIG. 8. Further, the initial transmission start date and time and the transmission cycles of IDs 130 and 131 are the same. The transmission reservation process with respect to the transmission information of IDs 130 and 131 will be described below as an example. N thus becomes 2, and the elements of the list L become the firmware information and the hard disk information.

In step S641, the transmission control unit 401 sorts the transmission information to be registered in the registration list according to the priority order, and sets the transmission information as the elements of the list L. Since the ID 130 is of higher priority according to the present example, the elements of the list L are sorted and registered in the order of L0, i.e., the firmware information (ID 130), and L1, i.e., the hard disk information (ID 131). In step S642, a variable n is initialized to 0.

In step S643, the transmission control unit 401 refers to the transmission setting information illustrated in FIG. 8 and acquires a previous transmission start date and time S, the transmission cycle I, and a transmission period t of Ln. If the transmission is the initial regular transmission, S becomes the initial transmission start date and time. For example, in the case of L0, i.e., the firmware information, the transmission cycle of 7 days and the transmission period t of 10 minutes are acquired.

In step S644, the transmission schedule calculation unit 403 calculates next scheduled transmission start date and time Sn, using a similar method as the method described in step S634 illustrated in FIG. 6B. The next scheduled transmission start date and time Sn is calculated using the following equation in which Tnow indicates the current time.

$$Sn=(Tnow-((Tnow-S)\%I))/I+I$$

The next scheduled transmission start date and time Sn of subsequent regular transmissions can be calculated by the following equation.

$$Sn=S+I$$

In step S645, the transmission schedule calculation unit 403 calculates a next scheduled transmission completion date and time En, using a similar method as the method described in step S636 illustrated in FIG. 6B, and the following equation.

$$En=Sn+t$$

In step S646, the transmission control unit 401 confirms whether there is transmission information to be regularly transmitted with highest priority whose transmission is scheduled to be completed before the next scheduled transmission completion date and time En calculated in step S646. If there is such transmission information, the transmission control unit 401 registers the transmission reservation data of the transmission information to the reservation list. The transmission reservation data includes the data type, the transmission start date and time, and the transmission completion date and time of the transmission information as the attribute information. On the other hand, if there is no such transmission information, the reservation process with respect to the transmission information to be regularly transmitted with highest priority is not performed.

If the transmission reservation data is to be registered to the reservation list, the process similar to that illustrated in FIG. 6B is performed. In such a case, the transmission control unit 401 registers the transmission reservation data of the transmission information to the reservation list in step S646 as follows. The previous transmission start date and time set in the transmission setting information illustrated in FIG. 8 becomes the transmission start date and time of the transmission reservation data at the bottom of the reservation list. Further, the transmission control unit 401 does not set the reservation timer event in step S638 illustrated in FIG. 6B.

In step S647, the overlap determination unit 406 determines whether there is transmission reservation data, whose period of regular transmission overlaps with the scheduled transmission start date and time Sn and the scheduled transmission completion date and time En of the data to be reserved, previously registered in the reservation list.

The overlap determination unit 406 performs determinations (1), (2), and (3) described below to determine whether the periods overlap in step S647. An element (i.e., transmission reservation data) to be registered in a reservation list RL will be referred to as RLi (0≤i<N), a transmission start date and time that is the attribute information of the element RLi as $L_{is}$, and a transmission completion date and time as $L_{ie}$. A total number of the transmission reservation data registered in the reservation list is indicated as N.

(1) If En≤$L_{0E}$ or $L_{(N-1)e}$≤Sn, there is no overlap.
(2) If there is i that satisfies $L_{(i-1)e}$≤Sn and En≤$L_{is}$ when i≥1, there is no overlap.
(3) There is an overlap for cases other than (1) and (2).

If the transmission periods overlap (YES in step S647), the process proceeds to step S648. In step S648, the overlap determination unit 406 replaces the transmission start date and time of the reservation data Sn with the transmission completion date and time $L_{ie}$ of Li, i.e., the overlapping transmission reservation data. The overlap determination unit 406 then calculates using the replaced Sn and sets the scheduled transmission completion date and time En of the reservation data.

On the other hand, if the transmission periods do not overlap (NO in step S647), the process proceeds to step S649. In step S649, the transmission control unit 401 registers the transmission reservation data to the reservation list. The transmission reservation data to be registered includes, as the attribute information, the firmware information (or the hard disk information) as the data type, the transmission start time Sn, and the transmission completion time En. In step S650, the transmission control unit 401 sets the timer event to the next transmission date and time. In step S651, the transmission control unit 401 increments n by 1. In step S652, the transmission control unit 401 determines whether n equals N. If n equals N (YES in step S652), the reservation process ends. If n does not equal N (NO in step S652), the process returns to step S643, and the similar process is performed with respect to the other elements in the list L.

Figure 7A:
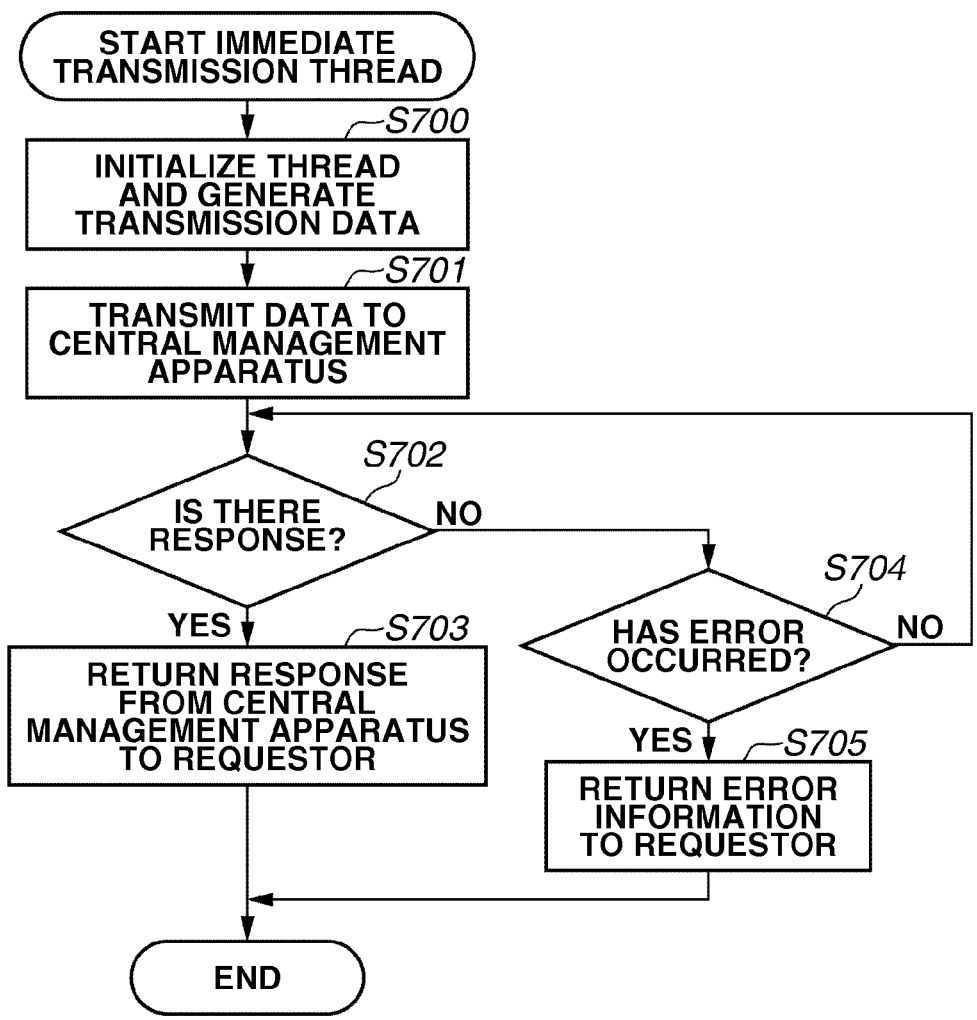
FIG. 7A is a flowchart illustrating a process performed by an immediate transmission thread in the monitoring apparatus.
Figure 7B:
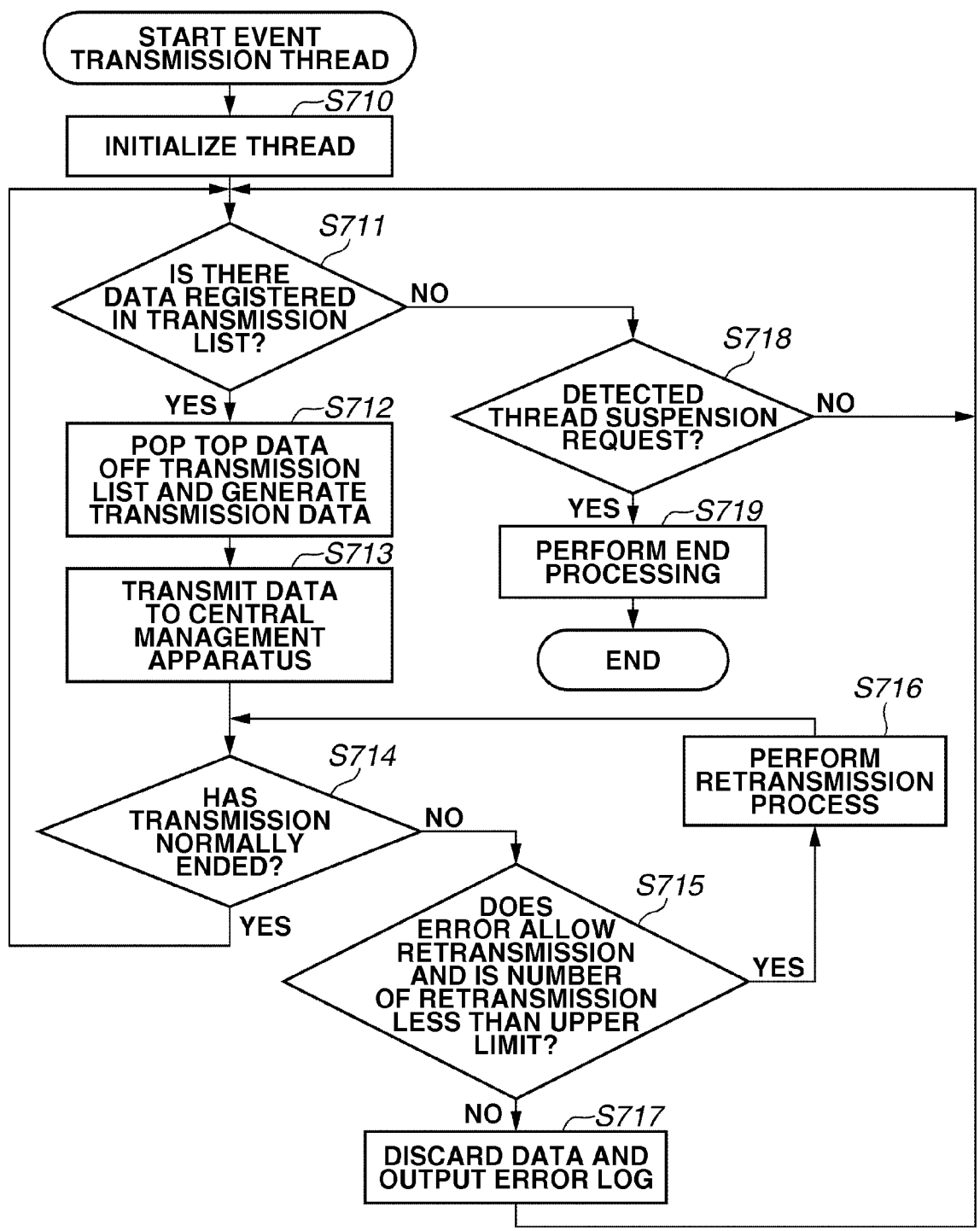
FIG. 7B is a flowchart illustrating a process performed by an event transmission thread in the monitoring apparatus.
Figure 7C:
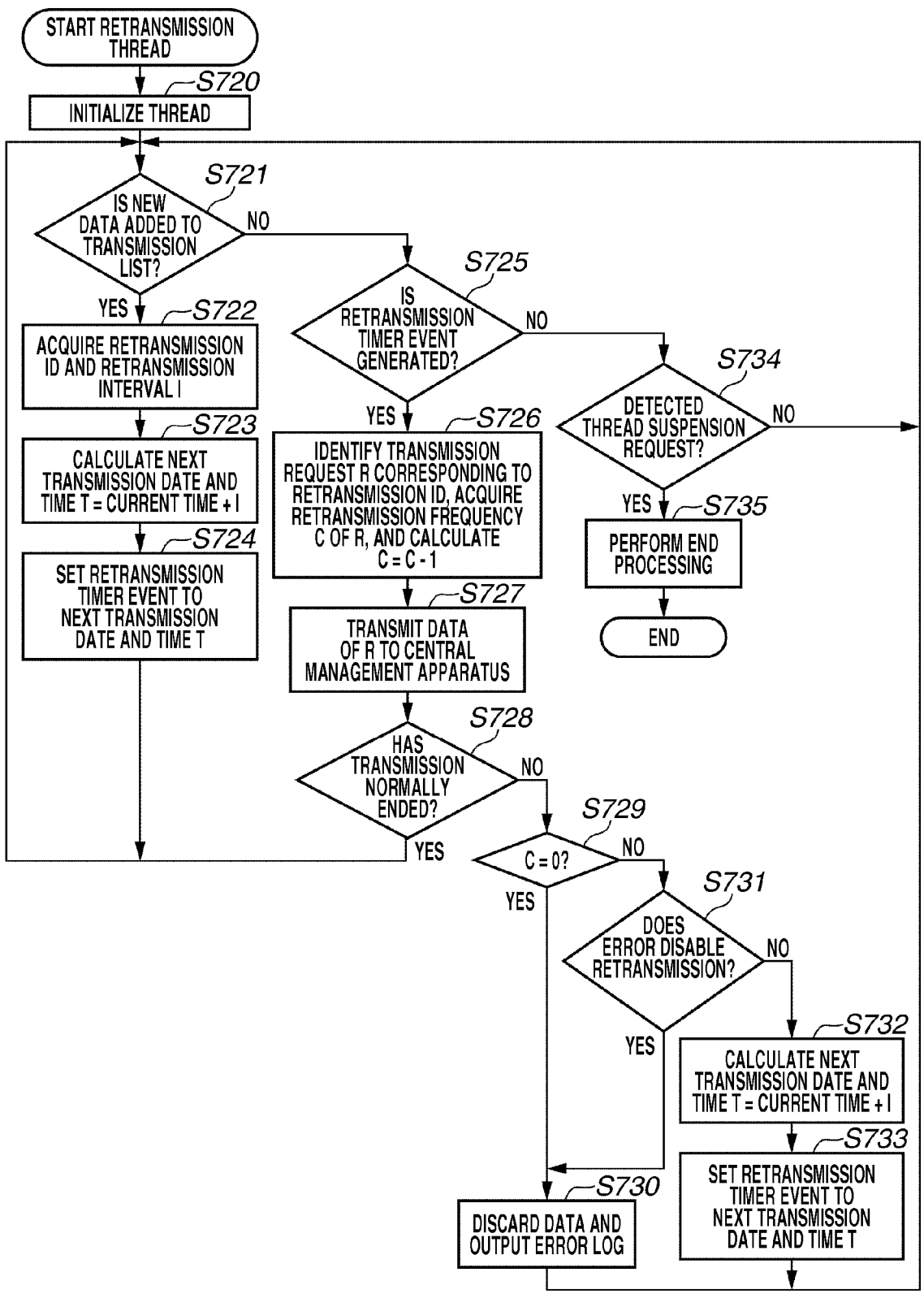
FIG. 7C is a flowchart illustrating a process performed by a retransmission thread in the monitoring apparatus.

The processes performed by each of the transmission threads will be described below with reference to the flowcharts illustrated in FIGS. 7A, 7B, and 7C.

The process performed in the activated immediate transmission thread will be described below with reference to FIG. 7A. The monitoring apparatus 101 starts the immediate transmission thread as described in the main flowchart illustrated in FIG. 5. Further, the monitoring apparatus 101 stores as an argument for starting the thread, the immediate transmission data requested to be transmitted, and waits for a response from the central management apparatus 105.

In step S700, upon activation of the immediate transmission thread from a main thread and after the initialization process is completed, the transmission data generation unit 408 generates the transmission data to be transmitted to the central management apparatus 105. In step S701, the transmission data transmission unit 409 transmits the data to the central management apparatus 105.

In step S702, the transmission control unit 401 determines whether there has been a response from the central management apparatus 105. If there has been a response from the central management apparatus 105 (YES in step S702), the process proceeds to step S703. In step S703, the transmission control unit 401 returns the response from the central management apparatus 105 to a transmission requestor (e.g., the UI in the image forming apparatus or the monitoring apparatus) and ends the immediate transmission thread.

On the other hand, if there has not been a response from the central management apparatus 105 (NO in step S702), the process proceeds to step S704. In step S704, the transmission control unit 401 determines whether a transmission error has occurred. If a transmission error has occurred (YES in step S704), the process proceeds to step S705. In step S705, the transmission control unit 401 returns the error message to the transmission requestor and ends the immediate transmission thread. If a transmission error has not occurred (YES in step S704), the process returns to step S702.

The process performed by the event transmission thread will be described below with reference to FIG. 7B. The monitoring apparatus starts the event transmission thread as described in the main flowchart illustrated in FIG. 5. Further, the event transmission thread also performs retransmission of an event.

In step S710, upon activation of the event transmission thread, the thread is initialized. In step S711, the transmission control unit 401 determines whether there is data that has been registered in the transmission list in step S519 illustrated in FIG. 5. If there is such data (YES in step S711), the process proceeds to step S712. In step S712, the transmission control unit 401 acquires the data at the top of the transmission list. The transmission data generation unit 408 then generates the transmission data to be transmitted to the central management apparatus 105. In step S713, the transmission data transmission unit 409 transmits the generated transmission data.

In step S714, the transmission control unit 401 determines whether the transmission has normally ended. If the transmission has normally ended (YES in step S714), the process returns to step S711. If the transmission has not normally ended (NO in step S714), the process proceeds to step S715. In step S715, the transmission control unit 401 determines whether the transmission error is an error (event) that allows retransmission of the transmission data, and the number of retransmissions is within the upper limit. The transmission error (event) does not allow retransmission of the transmission data when the data format is incorrect (damaged). If the transmission error can be retransmitted and the number of retransmissions is within the upper limit (YES in step S715), the process proceeds to step S716. In step S716, the transmission data transmission unit 409 retransmits the transmission data. On the other hand, if the transmission error is an error that does not allow retransmission of the transmission data, or the number of retransmissions is not within the upper limit (NO in step S715), the process proceeds to step S717. In step S717, the transmission control unit 401 discards the transmission data and outputs the error log. The process then returns to step S711.

Figure 5B:
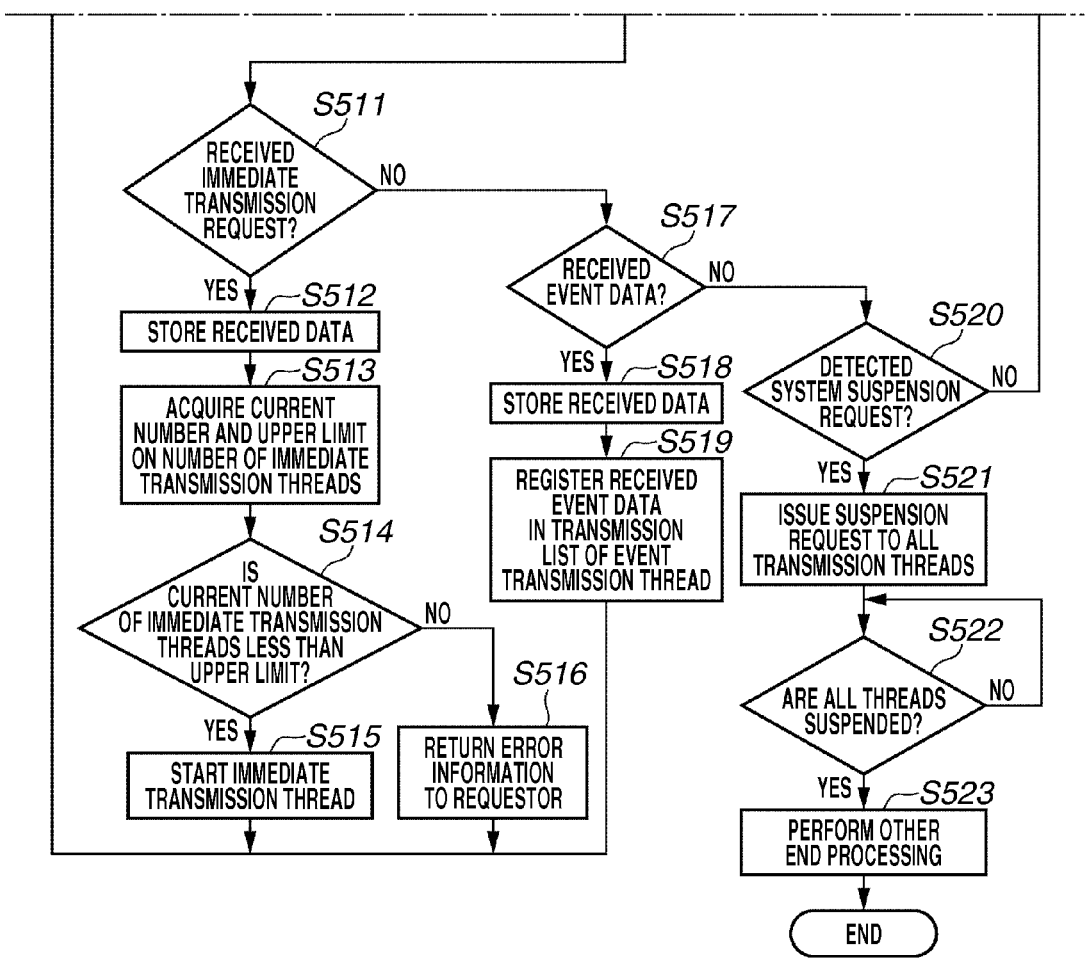
FIG. 5, composed of FIGS. 5A and 5B, is a flowchart illustrating a process performed by a monitoring apparatus according to an exemplary embodiment of the present invention.

If there is no data that is registered to the transmission list in step S519 illustrated in FIG. 5 (NO in step S711), the process proceeds to step S718. In step S718, the transmission control unit 401 determines whether the thread suspension request is issued. If the thread suspension request is issued (YES in step S718), the process proceeds to step S719. In step S719, the transmission control unit 401 performs thread end processing, and the event transmission thread ends. If the thread suspension request is not issued (NO in step S718), the process returns to step S711.

The process performed by the retransmission thread will be described below with reference to FIG. 7C. The monitoring apparatus 101 activates the retransmission thread as described in the main flowchart illustrated in FIG. 5. The retransmission thread according to the present exemplary embodiment is a thread for retransmitting the transmission information that is regularly transmitted. The regular transmission thread does not perform the retransmission process, and the retransmission thread performs the process instead. Further, the transmission data is previously generated in the process performed by the regular transmission thread and is stored to be retransmitted when there is a transmission failure.

In step S720, upon activation of the event transmission thread, the thread is initialized. In step S721, the transmission control unit 401 determines whether the retransmission data has been added to the retransmission list as a result of the processes performed in step S613 and step S622 illustrated in FIG. 6A. If the retransmission data has been added to the retransmission list (YES in step S721), the process proceeds to step S722. In step S722, the transmission control unit 401 acquires a retransmission interval I set to the added transmission data and a retransmission ID that is sequentially assigned to uniquely identify the retransmission data. Further, at least a number of retransmissions C and a storage address of the transmission information to be retransmitted are set to the retransmission data.

In step S723, the transmission control unit 401 calculates a next transmission date and time T (i.e., current date and time+I).

In step S724, the transmission control unit 401 sets a retransmission timer event to the calculated next transmission date and time T. The process then returns to step S721. The retransmission ID can be designated as the retransmission timer event, and if the event becomes a signal state, the data to be transmitted is identified using the retransmission ID.

If the retransmission data has not been added to the retransmission list (NO in step S721), the process proceeds to step S725. In step S725, the transmission control unit 401 determines whether the retransmission timer event has been generated. If the retransmission timer event has been generated (YES in step S725), the process proceeds to step S726. In step S726, the transmission control unit 401 identifies in the transmission list the retransmission data corresponding to the retransmission ID to be the object of the retransmission timer event. Further, the transmission control unit 401 acquires the number of retransmissions C of the identified retransmission data, and then subtracts 1 from C. In step S727, the transmission data transmission unit 409 retransmits to the central management apparatus 105 the transmission data corresponding to the retransmission data.

In step S728, the transmission control unit 401 determines whether the transmission has normally ended. If the transmission has normally ended (YES in step S728), the process returns to step S721. If the transmission has not normally ended (NO in step S728), the process proceeds to step S729. In step S729, the transmission control unit 401 determines whether the number of retransmissions C is 0. If the number of retransmissions C is 0 (YES in step S729), the process proceeds to step S730. In step S730, the transmission control unit 401 discards the retransmission data and the transmission data saved for retransmission and outputs the error log. The process then returns to step S721.

If the number of retransmissions C is not 0 (NO in step S729), the process proceeds to step S731. In step S731, the transmission control unit 401 determines whether the transmission error is an error that disables retransmission of the transmission data, i.e., the data format is incorrect (damaged), for example. If the transmission error is an error that disables retransmission of the transmission data (YES in step S731), the process jumps to step S730. On the other hand, if the transmission error is not an error that disables retransmission of the transmission data (NO in step S731), the process proceeds to step S732. In step S732, the transmission control unit 401 calculates the next transmission date and time T (i.e., current date and time+I). In step S733, the transmission control unit 401 sets the retransmission timer event to the next transmission date and time T similarly as in step S724. The process then returns to step S721.

If the retransmission timer event has not been generated (NO in step S725), the process proceeds to step S734. In step S734, the transmission control unit 401 determines whether the thread suspension request is issued. If the thread suspension request is issued (YES in step S734), the process proceeds to step S735. In step S735, the transmission control unit 401 performed thread end processing, and the event transmission thread ends. If the thread suspension request is not issued (NO in step S735), the process returns to step S721.

According to the above-described exemplary embodiment, the retransmission thread does not perform the processes according to the priority order. However, the retransmission thread may perform the processes according to the priority order, as will be described below.

In such a case, the retransmission thread also stores a retransmission reservation list that is a reservation list for retransmission. When the retransmission data is added in the retransmission thread, or if the retransmission has failed, the retransmission reservation data is registered to the retransmission reservation list. If there is an overlap in the retransmission periods when the retransmission reservation data is registered, the priority levels are compared, and the retransmission reservation data is arranged so that the retransmission data with higher priority is processed first. Further, when registering the retransmission reservation data, the respective transmission start dates and times of a new reservation and a changed reservation are adjusted. As a result, the retransmission process according to the priority levels of the data can be realized, and significant operation information can be retransmitted earlier.

According to the above-described exemplary embodiment, there is one regular transmission thread. However, a plurality of regular transmission threads may be used, depending on the performance of the information processing apparatus. The configuration of such a case will be described below.

For example, a number of regular transmission threads corresponding to the performance of the information processing apparatus is defined in the initial setting file and is read when the program is initialized. If there is a plurality of regular transmission threads, the overlap determination is performed by referring to the reservation list of each thread. If the transmission reservation data is to be newly registered, the data is registered in the reservation list of one of the threads so that the transmission periods do not overlap. If the transmission periods overlap in any of the threads when referring to the reservation lists of the plurality of threads, one of the threads is selected, and the period of the regular transmission is changed as described above. The transmission reservation data is then registered to the reservation list.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-111538 filed May 13, 2010, which is hereby incorporated by reference herein in its entirety.

What is claimed is:

1. An information processing apparatus which transmits operation information of an image forming apparatus to a management apparatus, using a regular transmission thread for transmitting to the management apparatus operation information to be regularly transmitted, and an event transmission thread for transmitting to the management apparatus operation information indicating an event according to generation of the event in the image forming apparatus, the information processing apparatus comprising:

a management unit configured to manage the operation information of the image forming apparatus;

a storing unit configured to store transmission setting information including a time necessary for transmission, a transmission cycle, and a previous transmission start time of each type of the operation information to be regularly transmitted;

an activation unit configured to start the regular transmission thread and the event transmission thread, a first registration unit configured to register in a reservation list, with respect to first operation information to be regularly transmitted according to the transmission cycle in the transmission setting information, first transmission reservation data including a transmission start time and a transmission completion time of the first operation information;

a second registration unit configured to register in the reservation list, with respect to second operation information that is different than the first operation information, second transmission reservation data including a transmission start time and a transmission completion time of the second operation information that are determined so that the second operation information is regularly transmitted in a different period than the first operation information, wherein the second transmission reservation data is registered in the reservation list after the first transmission reservation data is registered in the reservation list;

a transmission control unit configured to control, when the regular transmission thread activated by the activation unit transmits the first and second operation information to the management apparatus, transmission of the first and second operation information managed by the management unit according to the reservation list;

a central processing unit; and a non-transitory computer-readable medium in communication with the central processing unit, the non-transitory computer-readable medium storing a computer program that causes the central processing unit to execute at least the management unit, the activation unit, the first registration unit, the second registration unit, and the transmission control unit.

2. The information processing apparatus according to claim 1, wherein the operation information transmitted by the event transmission thread is failure information of the image forming apparatus.

3. The information processing apparatus according to claim 1, wherein the first operation information includes charging counter information.

4. The information processing apparatus according to claim 1, wherein the second registration unit sets, when newly registering the second transmission reservation data, a transmission start time of the second transmission reservation data to be newly registered as the transmission completion time of the first transmission reservation data previously registered in the reservation list.

5. The information processing apparatus according to claim 1, wherein, if transmission of the operation information by the event transmission thread activated by the activation unit fails, that operation information is retransmitted using the event transmission thread, and wherein, if transmission of the operation information by the regular transmission thread activated by the activation unit fails, that operation information that has failed to be transmitted is retransmitted using a retransmission thread that is different than the regular transmission thread activated by the activation unit.

6. A method for transmitting operation information of an image forming apparatus to a management apparatus, using a regular transmission thread for transmitting to the management apparatus operation information to be regularly transmitted, and an event transmission thread for transmitting to the management apparatus operation information indicating an event according to generation of the event in the image forming apparatus, the method executed in an operating environment that includes a central processing unit and a non-transitory computer-readable medium in communication with the central processing unit, the method comprising:

managing the operation information of the image forming apparatus;

storing transmission setting information including a time necessary for transmission, a transmission cycle, and a previous transmission start time for each type of the operation information to be regularly transmitted;

activating the regular transmission thread and the event transmission thread;

registering in a reservation list, with respect to first operation information to be regularly transmitted according to the transmission cycle in the transmission setting information, first transmission reservation data including a transmission start time and a transmission completion time of the first operation information;

registering, with respect to second operation information that is different than the first operation information, second transmission reservation data including a transmission start time and a transmission completion time of the second operation information that are determined so that the second operation information is regularly transmitted in a different period than the first operation information, wherein the second transmission reservation data is registered in the reservation list after the first transmission reservation data is registered in the reservation list;

controlling, when the activated regular transmission thread transmits the first and second operation information to the management apparatus, transmission of the first and second operation information according to the reservation list;

wherein the non-transitory computer-readable medium stores a computer program that causes the central processing unit to execute at least the managing, the activating, the registering first transmission reservation data, the registering second transmission reservation data, and the controlling.

7. A non-transitory computer-readable medium storing a computer program for causing a computer to execute a method for transmitting operation information of an image forming apparatus to a management apparatus, the method using a regular transmission thread for transmitting to the management apparatus operation information to be regularly transmitted, and an event transmission thread for transmitting to the management apparatus operation information indicating an event according to generation of the event in the image forming apparatus, the method comprising:

managing the operation information of the image forming apparatus;

storing transmission setting information including a time necessary for transmission, a transmission cycle, and a previous transmission start time for each type of the operation information to be regularly transmitted;

activating the regular transmission thread and the event transmission thread;

registering in a reservation list, with respect to first operation information to be regularly transmitted according to the transmission cycle in the transmission setting information, first transmission reservation data including a transmission start time and a transmission completion time of the first operation information;

registering, with respect to second operation information that is different than the first operation information, second transmission reservation data including a transmission start time and a transmission completion time of the second operation information that are determined so that the second operation information is regularly transmitted in a different period than the first operation information, wherein the second transmission reservation data is registered in the reservation list after the first transmission reservation data is registered in the reservation list; and controlling, when the activated regular transmission thread transmits the first and second operation information to the management apparatus, transmission of the first and second operation information according to the reservation list.

8. The non-transitory computer-readable medium according to claim 7, wherein the operation information transmitted by the event transmission thread is failure information of the image forming apparatus.

9. The non-transitory computer-readable medium according to claim 7, wherein the first operation information includes charging counter information.

10. The non-transitory computer-readable medium according to claim 7, wherein the registering, with respect to second operation information that is different than the first operation information, sets, when newly registering the second transmission reservation data, a transmission start time of the second transmission reservation data to be newly registered as the transmission completion time of the first transmission reservation data previously registered in the reservation list.

11. The non-transitory computer-readable medium according to claim 7, wherein, if transmission of the operation information by the event transmission thread activated by the activating fails, that operation information is retransmitted using the event transmission thread, and wherein, if transmission of the operation information by the regular transmission thread activated by the activating fails, that operation information that has failed to be transmitted is retransmitted using a retransmission thread that is different than the regular transmission thread activated by the activating.

\* \* \* \* \*